US006887911B2

(12) United States Patent
Shidaker et al.

(10) Patent No.: US 6,887,911 B2
(45) Date of Patent: May 3, 2005

(54) MOLDED FOAM ARTICLES PREPARED WITH REDUCED MOLD RESIDENCE TIME AND IMPROVED QUALITY

(75) Inventors: Trent A. Shidaker, Troy, MI (US); David W. Bareis, Shelby Township, MI (US); Herbert R. Gillis, West Deptford, NJ (US)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/458,821

(22) Filed: Jun. 11, 2003

(65) Prior Publication Data

US 2004/0034113 A1 Feb. 19, 2004

Related U.S. Application Data

(63) Continuation of application No. PCT/US02/01754, filed on Jan. 23, 2002.
(60) Provisional application No. 60/292,244, filed on May 18, 2001, provisional application No. 60/272,444, filed on Mar. 1, 2001, provisional application No. 60/267,246, filed on Feb. 8, 2001, and provisional application No. 60/263,706, filed on Jan. 24, 2001.

(51) Int. Cl.⁷ .............................................. C08G 18/40
(52) U.S. Cl. ...................... 521/112; 521/130; 521/170
(58) Field of Search ................................ 521/112, 130, 521/170

(56) References Cited

U.S. PATENT DOCUMENTS

| 3,095,386 A | 6/1963 | Hudson |
| 4,954,537 A | 9/1990 | Sanns, Jr. |
| 4,983,643 A | 1/1991 | Sanna, Jr. |
| 5,125,973 A | 6/1992 | Mafoti |
| 5,125,974 A | 6/1992 | Mafoti |
| 5,160,538 A | 11/1992 | Mafoti |
| 5,389,696 A | 2/1995 | Dempsey et al. |
| 5,576,409 A | 11/1996 | Mackey |
| 5,670,553 A | 9/1997 | Mackey |

FOREIGN PATENT DOCUMENTS

| WO | WO 00/06625 | 2/2000 |
| WO | WO 00/55242 | 9/2000 |

Primary Examiner—John M. Cooney, Jr.
(74) Attorney, Agent, or Firm—Nicole Graham

(57) ABSTRACT

Foamed molded articles produced by reaction injection molding (RIM) are provided. The molded articles are formed by reaction of a polyisocyanate component with an isocyanate reactive component in a mold using a blowing agent. The molded articles are preferably composites formed in the presence of a fibrous reinforcing material. The foamed articles are characterized by relatively short minimum mold residence times, and can thereby be produced more economically than prior art composites. The foamed articles are further characterized by a reduction in physical defects, such as splits and voids.

25 Claims, 1 Drawing Sheet

MOLDED FOAM ARTICLES PREPARED WITH REDUCED MOLD RESIDENCE TIME AND IMPROVED QUALITY

CROSS-REFERENCE TO RELATED APPLICATIONS

This application is a continuation of international application PCT/US02/01754, filed Jan. 23, 2002, and claims priority to U.S. Provisional Application Ser. No. 60/263,706, filed Jan. 24, 2001; U.S. Provisional Application Ser. No. 60/267,246, filed Feb. 8, 2001; U.S. Provisional Application Ser. No. 60/272,444, filed Mar. 1, 2001; and U.S. Provisional Application Ser. No. 60/292,244, filed May 18, 2001.

FIELD OF THE INVENTION

The present invention relates to improvements in the preparation of high quality expanded moldings by the reaction injection molding process. More specifically, it relates to improvements to the cycle time, and hence the economics, of the production of low density reactively processed molded articles, from the reaction of a polyisocyanate component with an isocyanate reactive component, preferably in the presence of water as a foaming agent.

BACKGROUND OF THE INVENTION

The reaction injection molding process (RIM) has been used to produce reactively processed expanded moldings from the reaction of a polyisocyanate composition with an organic isocyanate reactive composition, in the presence of water as a chemical blowing agent. These expanded moldings are often produced with added reinforcing materials, such as short fibers added to the chemical precursors (a process known as reinforced reaction injection molding, or R-RIM), or relatively long-fiber reinforcing structures such as mats pre-placed within the mold cavity (a process known as low-density structural reaction injection molding, or LD-S-RIM).

Shaped polyurethane-urea resin articles containing long fiber reinforcing structures, such as glass fiber mats, are routinely produced by the well known process called structural reaction injection molding (S-RIM). These structural composite articles are typically foamed in order to reduce part weight, to assist in mold filling, and to minimize part costs. Foamed S-RIM composites are often referred to as low density S-RIM (or LD-S-RIM). Polyurethane-urea S-RIM composite molded articles are prepared by impingement mixing a liquid stream of polyisocyanate with at least one other stream containing active hydrogen-containing liquids and optionally catalysts, fillers, mold release agents, etc. This reacting mixture is then transferred to a heated metal mold. A glass mat or a mat of another type of structural reinforcing fibers is placed in the mold prior to the impingement mixing of the liquid components. The reacting mixture penetrates the fibrous reinforcing mat and cures to form a shaped reinforced composite molded part. When one of the reactive liquid chemical precursors (components) contains a foaming agent, a foamed S-RIM part (LD-S-RIM article) is obtained. Water is the most commonly used foaming agent in polyurethane-urea LD-S-RIM molding processes, but other blowing agents may be used. The water is typically incorporated into the liquid isocyanate reactive component. When the reactive components are mixed, foaming occurs due to the formation of carbon dioxide formed from the reaction of the polyisocyanate with water. Urea linkages are also formed as a consequence of the isocyanate and water reaction. These urea linkages contribute to the buildup of molecular weight and eventual curing of the polymer. Urethane linkages are formed from the reaction of the polyisocyanate with organic polyols present in the isocyanate reactive component. Reactive chemical formulations used for the production of polyurethane-urea S-RIM (and LD-S-RIM) composite parts typically consist of two components; a polyisocyanate component (or A-component) and a single isocyanate reactive component (or B-component). The B-component most commonly comprises a mixture of the organic polyols with water as foam blowing agent. Water is typically the sole blowing agent. The B-component typically also contains the optional additives, such as catalysts and other optional ingredients. Catalysts, although optional, are typically used in these formulations in order to obtain an economically acceptable cure rate. S-RIM and LD-S-RIM processes are commonly used to manufacture shaped composite automotive articles such as interior trim parts, door panels, package trays, speaker enclosures, seat pans, and the like.

Developments in the chemistry of polymer systems used in S-RIM processes have resulted in urethane and urethane-urea polymer systems which are sufficiently cured to be demolded within about 65 to 105 seconds, as measured from the time that the injection of the reacting liquid component mixture into the mold has been completed. S-RIM processing equipment has also improved so that the mechanics of opening and closing the mold also require only about 10 to 70 seconds. Isocyanate-based polymers are excellent adhesives that bond tenaciously to surfaces such as decorative facings, such as vinyl or cloth, as well as to reinforcing fibers. This facilitates the consolidation of parts in the manufacture of very complex composite articles by means of S-RIM (including LD-S-RIM) processes.

Problems with unwanted adhesion of S-RIM moldings to the mold surface, which can result in difficulties in removing molded parts from the mold or damage to the parts during the process of demolding, have been addressed through the development of mold release technology. External mold release agents are used by applying a release agent directly onto the surface of the mold, generally by spraying or wiping. More recently internal mold release technologies have been developed, which greatly increase the number of consecutive parts that can be molded from a single application of an external release coating. Internal mold releases are chemical additive packages which are incorporated into one or more of the chemical precursor components of the S-RIM article, usually the B-component. A description of a particularly effective class of internal mold release agents, and the application thereof in S-RIM technology, is provided in, for example, U.S. Pat. Nos. 5,576,409 and 5,670,553. Combinations of state of the art internal and external mold release technologies have greatly reduced the cycle time per molded part in large-scale S-RIM production operations. These technologies have made it possible to mold hundreds of parts in succession without the necessity of cleaning the mold and re-applying the external mold release coating. This has considerably improved the productivity of the S-RIM process.

In spite of many recent improvements to the production economics of S-RIM processes, there is a strong need for further improvements in the direction of reduced cycle time per molded part. This need is strongest in the LD-S-RIM area, where foaming places severe practical limits on the minimum mold residence time per part.

Foaming of S-RIM composites is extremely important for weight reduction and cost minimization in automotive applications. The foaming reaction in typical water blown polyurethane-urea LD-S-RIM processes yields a molded composite part with a cellular structure. The foaming process currently dictates the minimum mold residence time for these parts. Even when the molded part has cured to the point where it is strong enough to be demolded without damage, the liberation of gas from the polymer can cause the part to swell and/or crack after the mold has been opened and even after the part has been completely removed from the mold. The swelling and/or cracking render the part unsuitable for use. This process, known commonly as "post blow", can result in grotesque internal splits and/or part swelling. The problem is most severe in thick parts, or thick sections of parts. Post blow can occur whether or not the expanded molded part contains reinforcing materials. The causes of post blow are not completely understood. It has been theorized that post blow may be caused by a continuation of the isocyanate and water reaction even after the part has developed adequate "green strength". Another possibility is that some of the blowing gas ($CO_2$) does not result in the formation of cells, but is instead dissolved in the polymer phase. According to this conjecture the dissolved gas comes out of solution when the mold pressure is released, resulting in splits and voids unless the polymer has reached a very advanced state of cure. Yet another theory suggests that the post blow phenomena are caused by the presence of large numbers of closed cells in the molded part, and hot gas due to the reaction after-heat. The true cause of post blow may be a combination of these things, or something else altogether. The important thing is that post blow phenomena put a practical lower limit on the minimum time that the part must be left in the mold before it can be safely removed (without post blow damage). This practical lower limit varies with the size and the geometry of the part but is typically about 105 seconds, as measured from the time that the injection of the reacting liquid component mixture into the mold has been completed.

In multi-part production runs, the percentage of scrap parts (i.e. parts with defects caused by post blow) increases sharply as the mold residence time is reduced below about 105 seconds. As the mold residence time is reduced below about 105 seconds, using the polyurethane urea LD-S-RIM systems of the prior art, a majority of the parts are of unacceptable quality (scrap). As the mold residence time is further reduced to below about 85 seconds, essentially all the moldings are scrap. Although the precise relationship between scrap rate and mold residence time varies somewhat with part geometry, it generally holds for geometrically complex parts, such as interior door panels, which are commonly produced in large volumes by the LD-S-RIM process in the automotive industry. A high scrap rate is clearly undesirable for the economics of the process, and also for environmental reasons. In large scale molding operations, common in the automotive industry, a scrap rate of greater than 5% would be unacceptable regardless of how short the mold residence time. A scrap rate of less than 1% is generally considered acceptable. A scrap rate of less than 0.5% is more desirable. In general, a formulation or process that can offer a reduction in mold residence time (and hence a reduced overall cycle time per molded part) along with a constant or reduced scrap rate would be considered highly desirable in industry.

The post mold expansion (post blow) problem described above causes defects in part quality that cause scrap rates to go up quickly as mold residence times are reduced. These defects include internal splits and/or cracking that are visible at the surface of the part. Splits are especially problematic in thick parts or thick sections of parts. The splits may not be visible on the part surface. A tell tale sign that splitting has occurred is a visible bulge in the part upon mold opening that does not go away. This will result in a part being scrapped. Obviously, a split that is directly visible on the surface will also result in the part being scrapped.

Another important class of defects are large voids and bubbles that are visible on the top surface of a part, especially those which form immediately beneath a facing material (such as vinyl coverstock). These large surface (or near-surface) bubbles can be seen in the surface of the part, and make it cosmetically unacceptable. These kinds of surface-visible defects are important in "pour behind" molding processes (wherein the liquid reaction system is injected or poured behind the facing material in the mold). Although the presence of such large surface-visible defects (sometimes referred to as voids; blisters; or as de-lamination, in the case of very large bubbles behind impervious facings) can sometimes be fixed (i.e., by puncturing the facing above the bubble or filling the area of the void where necessary), these large visible defects usually result in scrap parts.

In the industry the term "void" generally refers to a large hole or bubble within the foam itself, whereas the term "bubble" refers to an area of interfacial non-adhesion between the foam part and a facing material thereon (such as a vinyl facing layer). If the area of interfacial non-adhesion (bubble) is large enough it will become quite an obvious defect, since trapped gases within the part will collect in this non-adhering interfacial area and raise a large bubble under the facing material. Voids, on the other hand, may begin as nucleation points in the foam itself which subsequently grow and/or coalesce as the reaction mixture expands (resulting in a bulge, or a depression on the surface, which indicates the presence of a void in the foam).

The presence of a surface-visible void or bubble of greater than an inch across (at its widest point) will result in a molded part being scrapped. In fact, a surface-visible void or bubble of greater than one half inch across will usually result in a part being discarded as scrap. It is therefore desirable to have formulations or processes that can be used to produce molded parts with reduced mold residence time, but without increased tendency to form splits or large surface-visible voids or bubbles (surface-visible defects).

The reaction chemistry, the processing equipment, and the use of internal mold release technology have made it theoretically possible to achieve minimum mold residence times for LD-S-RIM parts of much less than 105 seconds (as measured from the time that the injection of the reacting liquid component mixture into the mold has been completed). It is in fact possible in principle to demold such parts in less than 65 seconds, and even less than 55 seconds. A doubling of the productivity of LD-S-RIM could therefore be achieved if these very short mold residence times could be achieved in practice, without increasing the scrap rate. This dramatic further improvement is currently not possible, because of defects caused by post blow phenomena. It would be of considerable value to develop an LD-S-RIM system with reduced processing cycle times, which does not suffer from the limitations imposed by post blow problems, but which otherwise performs at the level of the current state of the art using existing processing equipment and without requiring special processing conditions. It would be desirable to have water blown LD-S-RIM systems from which viable parts can be demolded in less than 65 seconds, as measured from the point that the injection of the reacting liquid component mixture into the mold has been completed. It would further be desirable to have other types of water blown RIM processable reaction systems from which viable parts can be demolded in under 65 seconds, whether or not a reinforcing material is used.

SUMMARY OF THE INVENTION

One aspect of the present invention is a water-blown LD-S-RIM reaction system suitable for the production of molded composite LD-S-RIM articles which can be demolded in less than 65 seconds after injection is completed without an increase in post-blow damage, relative to the same articles made from the same system and demolded 105 seconds after injection is completed (using the same processing equipment and process conditions).

A further aspect of the invention is an improved LD-S-RIM process which produces a greater number of viable parts, in relation to prior art LD-S-RIM systems, when the parts are demolded within 65 seconds after injection is completed without an increase in post-blow damage, relative to the same articles made from the same system and demolded 105 seconds after injection is completed (using the same processing equipment and process conditions).

Yet a further aspect of the invention is a reaction system which is suitable for the production of expanded moldings by the RIM process wherein viable moldings can be more consistently produced, relative to prior art systems, within 65 seconds from the point that injection is completed without an increase in post-blow damage, relative to the same articles made from the same system and demolded 105 seconds after injection is completed (using the same processing equipment and process conditions).

Still further aspects of the invention include a process for making expanded moldings of consistently high quality with reduced processing cycle time, and moldings prepared according to such process.

All of the above cited aspects of the invention involve the use of a reactive chemical formulation, as precursor of the RIM processed expanded moldings, comprising the following five essential ingredients:

I) a polyisocyanate composition, comprising a polyisocyanate having a number averaged isocyanate group functionality of at least 1.8;
II) an isocyanate reactive organic composition comprising at least one organic polyol, the polyol having a number averaged functionality of primary and/or secondary alcohol groups of at least 1.8;
III) at least one blowing agent;
IV) at least one fatty compound of 10 carbon atoms or greater selected from the group consisting of a fatty polyester, a fatty acid ester, and a fatty amide; and
V) a polysiloxane composition comprising an effective amount of at least one member selected from the group consisting of,
  A) at least one polydimethylsiloxane polyoxyalkylene copolymer containing greater than 60 siloxane linkages, and
  B) a combination comprising at least one polydimethylsiloxane polyoxyalkylene copolymer containing 60 siloxane linkages or fewer, and at least one polydimethylsiloxane fluid.

In the preferred embodiments the blowing agent (III) comprises water; and the fatty compounds (IV) are all aliphatic fatty compounds free of aromatic rings or functional groups other than hydrocarbon groups, ester groups, or amide groups. In still more preferred embodiments the polysiloxane composition (V) comprises an effective amount of a polydimethylsiloxane polyoxyalkylene copolymer containing greater than 60 siloxane linkages, more preferably greater than 70 siloxane linkages, and both a plurality of oxyethylene units and a plurality of oxypropylene units. In a further preferred embodiment the blowing agent (III) consists essentially of water.

DETAILED DESCRIPTION OF THE INVENTION

Figure 1:
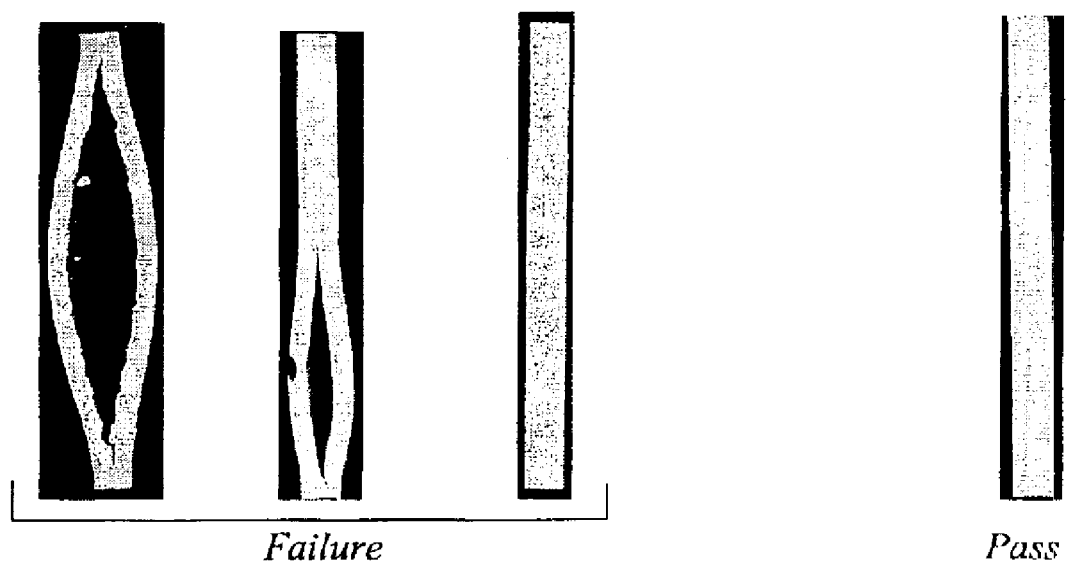
FIG. 1 illustrates cross-sectional examples of plaques that have been tested using the fast demold protocol.

The improved processable reaction systems of the invention comprise a polyisocyanate composition; an isocyanate reactive composition comprising at least one organic polyol; a blowing agent (preferably water); an effective amount of a polysiloxane composition; and at least one fatty compound selected from the group consisting of a fatty polyester, a fatty acid ester, and a fatty amide. The term "fatty" means compounds comprising one or more alkyl substituents of 8 or more carbon atoms and preferably 12 or more carbon atoms. Preferably these alkyl substituents are aliphatic hydrocarbon groups, and most preferably linear aliphatic hydrocarbon groups. In addition to these five essential ingredients there may also be present optional ingredients normally used in the art. These optional ingredients preferably include at least one catalyst. The optional ingredients may further include additional internal mold release agents such as those known in the S-RIM art, particulate fillers, fire retardants, pigments, surfactants, dyes, and other known additives.

The terms "mold residence time" and "demold time" refer to the length of time that elapses between the completion of the injection of the mixed reaction system into the mold until the molded part is completely removed from the mold. The "completion of the injection of the mixed reaction system" is the point at which the last of the reacting chemical formulation (the reaction system, with all components mixed) enters the mold. The terms "minimum mold residence time" and "minimum demold time" refer to the shortest mold residence time that can be used in making viable (industrially usable) molded parts. Parts which have noticeable post blow damage, such as for example splits, swelling or bulges (i.e. due to internal splits), are considered scrap (not industrially usable). Clearly, there is an economic driving force in multipart production operations to run at the shortest possible mold residence time per part. This minimizes overall cycle time per part.

The term "siloxane linkage", or "siloxane unit", will be understood to mean a complete Si—O—Si linkage. The individual silicon atoms, in this definition of the siloxane linkage, may also participate in other siloxane linkages. For example, the linear structure "Si—O—Si—O—Si—O—Si" depicts three siloxane linkages. The individual silicon atoms may, in this definition of the siloxane linkage, participate in other types of chemical bonds that are not siloxane linkages. For example, the structure "(CH3)3Si—O—Si(CH3)2-O—CH2CH2-OH" contains just one siloxane linkage.

In an aspect of the invention a fibrous structural reinforcement is used. The fibrous reinforcements may include short fibers introduced into the molding via one or more of the liquid chemical precursor streams (the R-RIM process). In the R-RIM process the reinforcing fibers are on average typically 0.25 inches or less in length, so that they can pass through the mixing apparatus of the RIM processing machine.

In a particularly preferred aspect of the invention a fibrous reinforcing structure comprising relatively long fibers is placed inside the mold prior to the introduction of the reaction system into the mold. In this preferred aspect (the LD-S-RIM process) the fibrous reinforcing structure is typically a mat, and the fibers typically range in average length from 0.5 inches in length to continuous strands (e.g. several feet or more in length).

In still another aspect of the invention, the optional reinforcing fibrous material may be introduced into the molded part by continuous chopping of fibrous strands at the mixing head of the processing machine, wherein the chopped strands are then combined in situ with the chemical reaction system and introduced into the mold to form a foamed composite molded article. In this aspect of the invention, the chopped fibers are typically on average from 0.25 inches to about 6 inches in length, more commonly from greater than 0.25 inches to about 1.0 inches in length. This mode of processing is sometimes referred to as the long fiber injection (or LFI) process. The LFI process is often used with an initially open mold, into which the mixture of chopped fibers and reacting chemicals is injected. The mold is then typically closed after the injection is completed. The composite part then foams, fills, and cures in the closed mold. The mold is then re-opened and the LFI part is removed.

The ingredients of the RIM formulation (e.g. the reaction system) according to the invention are preferably formulated into two reactive streams, the streams being liquid under the conditions of processing, wherein the polyisocyanate composition is maintained separate from the isocyanate reactive ingredients and catalysts. The component comprising the polyisocyanate is usually called the A-component. The A-component may optionally also contain all or part of the polysiloxane composition in admixture with the polyisocyanate composition. The isocyanate reactive component, including the polyols and blowing agents, and any catalysts are preferably formulated into the second reactive stream, known as the B-component. In a preferred embodiment the B-component also contains the polysiloxane composition in its entirety, and all the optional additional ingredients.

The separate streams of the preferred two component RIM processable reaction system are loaded into the separate storage tanks of a reaction injection molding (RIM) machine and maintained in a liquid state, with agitation as necessary to prevent the separation of any ingredients that are not fully miscible in the bulk phase of each liquid component. The two streams are then impingement mixed at a specified ratio by weight and the resulting mixture is conducted while still in the liquid state to the mold.

In the most preferred embodiment (LD-S-RIM process), the mold contains at least one fibrous reinforcing structure, which is preferably a mat structure consisting of fibers of one half inch in length or greater. The reinforcing mat structure may be of a woven or non woven type. The reacting liquid mixture of components enters the mold and penetrates the fibrous mat. The mixture then foams and cures in the mold to form a fiber reinforced shaped polyurethane urea composite article. Preferably the shaped composite article is removed from the mold as soon as it has developed sufficient green strength to permit the handling thereof without damage. This basic process is preferably repeated many times in succession. The more rapidly the parts can be demolded without damage, the better the economics of the molding process.

The mold used in this process is in some aspects of the invention a closed mold, which is filled with the reacting resin mixture when closed and then opened to remove the cured part. In other aspects of the invention the reacting resin mixture is poured into the open mold over the fiber reinforcing structure, the mold is closed before the foaming is completed and then opened later to remove the cured part. When a molded part has been removed, one or more reinforcing structures may be placed in at least one of the mold sections and the mold is then ready for the next molding cycle. Closed mold processes, wherein the mold is closed during at least part of the molding cycle, are preferred. However it is within the scope of the invention to use completely open mold processing. In such an open molding process, one or more reinforcing structures may be placed in the open section and the reacting resin mixture, formed in the impingement mixing step inside the RIM machine, is either poured or sprayed into the open mold (over the fibrous reinforcing structure, if one is used) where it subsequently foams and cures in the open mold. The expanded molded part is then removed and the cycle may be repeated. In an open molding process the mold remains open throughout the entire molding cycle.

The RIM machine comprises a metering apparatus that controls the weight ratio of the liquid reactive components. The weight ratio of components is controlled in order to conform to the desired stoichiometry of the polymerization reaction. This reaction stoichiometry is expressed in the art by a quantity known as the "Index". The Index of a reactively processed isocyanate-based RIM formulation is simply the ratio of the number of isocyanate equivalents (indicating the number of —NCO groups available) to the number of equivalents of isocyanate reactive groups (indicating the number of available groups which are capable of reacting with the isocyanate under the conditions used in the reaction). This equivalents ratio is usually expressed as a percent. An Index of greater than 100 (100%) indicates an excess of isocyanate groups relative to isocyanate reactive groups, and vice versa. The recommended range of Index values used to process the preferred LD-S-RIM systems of the invention are from about 80 to about 150, but may extend as high as about 1500 if a catalyst for the trimerization of isocyanate groups is present in the formulation. A more preferred range of Index values is between 90 and 130, still more preferably between 95 and 120, even more preferably between 98 and 110 and most preferably between 100 and 105. A modest excess of isocyanate groups is generally preferred in LD-S-RIM. It is believed that most of the excess isocyanate is consumed by traces of reactive species or moisture on the surface of the reinforcing structures.

It is highly preferred that the RIM reaction systems of the invention contain a catalyst package capable of promoting both the reaction of the isocyanate with organic polyols and of the isocyanate with water. Such catalysts are well known in the art. The catalyst package may consist of a single catalyst or a mixture of two or more catalysts. Preferred catalysts are selected from the group consisting of tertiary amines, tertiary amine acid salts, organic metal salts, and combinations of these. Examples of preferred tertiary amine catalysts include triethylenediamine, N,N-dimethyl cyclohexylamine, bis-(dimethylamino)-diethyl ether, N-ethyl morpholine, N,N,N',N',N"-pentamethyl diethylenetriamine, N,N-dimethyl aminopropylamine, N-benzyl dimethylamine, and aliphatic tertiary amine-containing amides of carboxylic acids, such as the amides of N,N-dimethyl aminopropylamine with stearic acid, oleic acid, hydroxystearic acid, and dihydroxylstearic acid. N,N-dimethylcyclohexylamine is a particularly preferred tertiary amine catalyst in LD-S-RIM. Commercially available tertiary amine catalysts include the JEFFCAT® brand amines from Huntsman Petrochemical Corporation; the POLYCAT® brand amines and the DABCO® brand amine catalysts both available form Air Products and Chemicals Inc.

Examples of suitable tertiary amine acid salt catalysts include those prepared by the at least partial neutralization of formic acid, acetic acid, 2-ethyl hexanoic acid, oleic acid, or oligomerized oleic acid with a tertiary amine such as triethylenediamine, triethanolamine, triisopropanolamine, N-methyl diethanolamine, N,N-dimethyl ethanolamine, mixtures of these amines, or the like. These amine salt catalysts are sometimes referred to as "blocked amine catalysts", owing to delayed onset of catalytic activity which provides for improved ease of mold filling.

Examples of preferred organic metal salts for use as catalysts include potassium 2-ethyl hexanoate, potassium oleate, potassium acetate, potassium hydroxide, dibutyltin dilaurate, dibutyltin diacetate, and dibutyltin dioleate.

Further examples of useful catalysts suitable for use in the invention include amido amine compounds derived from the amidization reaction of N,N-dimethyl propanedimine with fatty carboxylic acids. A specific example of such a catalyst is BUSPERSE® 47 catalyst from Buckman Laboratories.

Mixtures of tertiary amine, amine acid salt, and/or metal salt catalysts may be used. The use of mixed catalysts is well known to those skilled in the art.

It is also preferred that the RIM processable reaction formulations contain an internal mold release package. The internal mold release package, or IMR, greatly improves the productivity of the molding process by reducing or eliminating the need to clean and re-treat the mold between molding cycles. The IMR package is preferably used in combination with an external mold release (XMR) applied to the surface of the mold itself. The XMR is usually applied to the clean mold surface at the beginning of a multi-part molding cycle. When the preferred LD-S-RIM aspect of the invention is practiced in combination with IMR, long multipart molding cycles, resulting in the production of 100 or more viable parts in succession, may be conducted without reapplication of XMR. A more detailed description of the preferred IMR and XMR technologies for use in conjunction with this invention, as well as some examples of preferred processes and examples of prior art polyurethane urea LD-S-RIM reaction formulations, can be found in, for example, U.S. Pat. Nos. 5,576,409 and 5,670,553; the subject matter of which are herein incorporated fully by reference.

The reaction systems of the invention must contain at least one blowing agent, in order to produce foaming. Blowing agents may be of the chemical or physical type, as is well known in the polyurethane art. Combinations of both types may be used if desired.

The preferred reaction systems of the invention contain water as an essential blowing agent. The more preferred LD-S-RIM reaction systems of the present invention contain water as the principal blowing agent, responsible for most of the volume expansion (foaming). The most preferred LD-S-RIM reaction systems of the present invention contain water as the sole blowing agent.

Water is a chemical blowing agent because it generates blowing gas, in this case carbon dioxide, by means of a chemical reaction. In the case of water, the chemical reaction is with the isocyanate groups present in the formulation, thus liberating $CO_2$. However, it is within the scope of the invention to use, either alone or in addition to water, one or more other blowing agents. These alternative blowing agents are selected from the group consisting of other chemical blowing agents, and physical blowing agents. Physical blowing agents include volatile compounds that boil below 70° C. at 1 atmosphere pressure. Examples of physical blowing agents used in the polyurethane art include CFCs such as trichlorofluoromethane; HCFCs such as dichlorofluoromethane and the dichlorofluoroethanes; HFCs such as the tetrafluoroethanes, pentafluoropropanes, pentafluorobutanes, and hexafluorobutanes; simple hydrocarbons such as the butanes and pentanes; and cyclic hydrocarbons such as cyclopentane. Still further examples of alternative physical blowing agents which may be used include nitrogen, air, carbon dioxide and mixtures of these simple atmospheric gases, which may be pre-dissolved into one or more of the reaction system components or injected into the reaction mixture at or after the point where the reaction system components are mixed but before the reacting mixture is injected into the mold. Examples of alternative chemical blowing agents include azodicarbonamide, glycerol carbonate, hydroxacetone, 1-hydroxy-3-butanone, and mono and/or polyfunctional carboxylic acids. Combinations of these alternative agents may also be used. These examples of alternative blowing agents are not to be considered as limiting.

Mixtures of blowing agents may of course be used if desired. A preferred blowing agent combination is water plus an atmospheric gas, especially air or nitrogen, wherein the atmospheric gas is dissolved or dispersed in at least one of the liquid reaction system components.

A non-limiting example of another blowing agent combination is a blowing agent system comprising water and one or more carboxylie acids. Carboxylic acids can react with isocyanates to liberate carbon dioxide. The carbon dioxide thus liberated contributes to the blowing (foaming) of the reaction system during the polymer forming process.

The improved RIM processable reaction systems of the invention contain a polyisocyanate composition. The polyisocyanate composition preferably consists of organic polyisocyanates having a number averaged isocyanate (—NCO) functionality of from at least 1.8 to about 4.0. In practicing the LD-S-RIM aspect of the invention, the number averaged isocyanate functionality of the polyisocyanate composition is preferably from 2.0 to about 3.0, more preferably from 2.3 to 2.9.

The organic polyisocyanates that may be used in the RIM systems include any of the aliphatic, cycloaliphatic, araliphatic, or aromatic polyisocyanates known to those skilled in the art. Especially preferred are those polyisocyanates that are liquid at 25° C. Examples of suitable polyisocyanates include 1,6-hexamethylenediisocyanate; isophorone diisocyanate; 1,4-cyclohexane diisocyanate; 4,4'-dicyclohexylmethane diisocyanate; 1,4-xylylene diisocyanate; 1,4-phenylene diisocyanate; 2,4-toluene diisocyanate; 2,6-toluene diisocyanate; 4,4'-diphenylmethane diisocyanate (4,4'-MDI); 2,4'-diphenylmethane diisocyanate (2,4'-MDI); polymethylene polyphenylene polyisocyanates (crude, or polymeric, MDI); and 1,5-naphthalene diisocyanate. Mixtures of these polyisocyanates can also be used. Moreover, polyisocyanate variants, for example polyisocyanates that have been modified by the introduction of urethane, allophanate, urea, biuret, carbodiimide, uretonimine, isocyanurate, and/or oxazolidone residues, can also be used.

In general, aromatic polyisocyanates are preferred. The most preferred aromatic polyisocyanates are 4,4'-MDI, 2,4'-

MDI, polymeric MDI, MDI variants, and mixtures of these. Isocyanate terminated prepolymers may also be employed. Such prepolymers are generally prepared by reacting a molar excess of polymeric or pure polyisocyanate with one or more polyols. The polyols may include aminated polyols, imine or enamine modified polyols, polyether polyols, polyester polyols or polyamines. Pseudoprepolymers, which are a mixture of isocyanate terminated prepolymer and one or more monomeric di or polyisocyanates, may also be used.

Commercially available polyisocyanates useful in the present invention include the RUBINATE® brand polymeric isocyanates available from Huntsman Polyurethanes.

A specific example of a preferred polyisocyanate composition particularly suitable for use in the LD-S-RIM aspect of the invention is RUBINATE® 8700 isocyanate. This liquid isocyanate is of the polymeric MDI type and has an —NCO content of 31.5% by weight and a number averaged isocyanate group functionality of 2.7.

The improved RIM processable reaction formulations of the invention also contain an isocyanate reactive organic composition. The isocyanate reactive composition comprises at least one organic polyol, wherein the organic polyol has a number averaged functionality of organically bound primary or secondary alcohol groups of at least 1.8. In practicing the LD-S-RIM process the number averaged functionality of the polyol is from 1.8 to 10, more preferably from 1.9 to 8, still more preferably from 2 to 6, and most preferably from 2.3 to 4.

In practicing RIM in more specific aspects the isocyanate reactive organic composition will preferably comprise a mixture of two or more organic polyols. The individual polyols in the mixture will differ principally in regard to hydroxyl group functionality and molecular weight. The organic polyols used in the isocyanate composition are selected from the group consisting of softblock polyols, rigid polyols, and chain extenders or crosslinkers.

Polyols that furnish softblock segments are known to those skilled in the art as softblock polyols, or as flexible polyols. Such polyols generally have a number averaged molecular weight of at least about 1500 and preferably from about 1750 to about 8000, a number averaged equivalent weight of from about 400 to about 4000 preferably from about 750 to 2500, and number averaged functionality of isocyanate reactive groups of about 1.8 to about 10 and preferably from about 2 to about 4. Such compounds include e.g. aliphatic polyether or aliphatic polyester polyols comprising primary and/or secondary hydroxyl groups. In practicing the LD-S-RIM process it is preferred that these softblock polyols comprise from about 0 to about 30% by weight and more preferably from about 0 to about 20% by weight of the isocyanate reactive species present in the polyol composition. Preferred softblock polyols are liquid at 25° C.

Polyols that provide structural rigidity in the derived polymer are referred to in the art as rigid polyols. These are a preferred class for use in LD-S-RIM. Such polyols generally have number averaged molecular weights of from 200 to about 3000, preferably from 250 to less than 1500; number averaged equivalent weights of from 80 to about 700, preferably from 85 to about 300; and number averaged isocyanate reactive group functionalities of from 2 to 10, preferably 3 to 6. Such compounds include, for example, polyether or polyester polyols comprising primary and/or secondary hydroxyl groups. Preferred rigid polyols are liquid at 25° C.

Polyols which are referred to the in the art as chain extenders and/or crosslinkers are another preferred class for use in LD-S-RIM. These have molecular weights between 60 to less than 200, preferably from 60 to about 100; equivalent weights from 30 to less than 100, preferably 30 to 70; and isocyanate-reactive group functionalities of from 2 to 4, and preferably from 2 to 3.

Examples of suitable chain-extenders/crosslinkers are simple glycols and triols such as ethylene glycol, propylene glycol, dipropylene glycol, 1,4-butanediol, 1,3-butanediol, triethanolamine, triisopropanolamine, tripropylene glycol, diethylene glycol, triethylene glycol, glycerol, mixtures of these, and the like. The most preferred chain-extenders/ crosslinkers are liquids at 25° C. Although aliphatic —OH functional compounds, such as those just listed, are the most preferred as chain-extenders/crosslinkers, it is within the scope of the invention to employ certain polyamines, polyamine derivatives, and/or polyphenols. Examples of suitable amines known in the art include diisopropanolamine, diethanolamine, and 3,5-diethyl-2,4-diaminotoluene, 3,5-diethyl-2,6-diaminotoluene, mixtures of these, and the like. Examples of suitable isocyanate reactive amine derivatives include certain imino-functional compounds such as those described in European Patent Application Nos. 284,253 and 359,456; and certain enamino-functional compounds such as those described in European Patent Application No. 359,456 having 2 isocyanate-reactive groups per molecule. Reactive amines, especially aliphatic primary amines, are less preferred due to their extremely high reactivity with polyisocyanates, but may optionally be used if desired in minor amounts.

It is also within the scope of the invention, albeit less preferred, to include within the polyol composition minor amounts of other types of isocyanate reactive species which may not conform to the types described hereinabove.

It is to be understood that the terms "chain extender" and "crosslinker" are interchangeable as used herein. However the term "chain extender" is sometimes used in the art to refer only to difunctional low molecular weight isocyanate reactive species, whereas the term crosslinker is sometimes limited to low molecular weight isocyanates reactive species having a functionality of 3 or more.

A preferred organic polyol composition for use in LD-S-RIM comprises a mixture of (a) about 0 to 20% by weight of at least one polyol having a molecular weight of 1500 or greater and a functionality of 2 to 4; (b) about 70–98% weight of at least one polyol having a molecular weight between 200 and 500 and a functionality of about 2 to about 6; and (c) about 2 to about 15% by weight of a least one polyol having a functionality of about 2 to about 4 and a molecular weight of less than 200. The weights of (a)+(b)+ (c) total 100% of the organic polyol composition in this preferred composition for LD-S-RIM. All the polyol species in this preferred mixed polyol composition contain essentially all primary and/or secondary aliphatically bound organic —OH groups.

It is to be understood unless otherwise stated that all functionalities, molecular weights, and equivalent weights described herein with respect to polymeric materials are number averaged, and that all functionalities, molecular weights, and equivalent weights described with respect to pure compounds are absolute.

As noted above, both the softblock polyols and the rigid polyols may be of either the polyether or the polyester type. Polyether based polyols are generally more preferred in the LD-S-RIM aspect of the invention.

Suitable polyether polyols that can be employed in the reaction systems of the invention include those that are prepared by reacting an alkylene oxide, a halogen substituted or aromatic substituted alkylene oxide or mixtures thereof, with an active hydrogen containing initiator compound.

Suitable oxides include, for example, ethylene oxide, propylene oxide, 1,2-butylene oxide, styrene oxide, epichlorohydrin, epibromohydrin, mixtures thereof, and the like. Propylene oxide and ethylene oxide are particularly preferred alkylene oxides.

Suitable initiator compounds include water, ethylene glycol, propylene glycol, butanediols, hexanediols, glycerine, trimethylolpropane, trimethylolethane, pentaerythritol, hexanetriols, sucrose, hydroquinone, resorcinol, catechol, bisphenols, novolac resins, phosphoric acid, and mixtures of these.

Further examples of suitable initiators include ammonia, ethylenediamine, diaminopropanes, diaminobutanes, diaminopentanes, diaminohexanes, diethylenetriamine, triethylenetetramine, tetraethylenepentamine, pentamethylenehexamine, ethanolamine, aminoethylethanolamine, aniline, 2,4-toluenediamine, 2,6-toluenediamine, 2,4'-diaminodiphenylmethane, 4,4'-diaminodiphenylmethane, 1,3-phenylenediamine, 1,4-phenylenediamine, naphthylene-1,5-diamine, triphenylmethane-4,4',4"-tramine, 4,4'-di-(methylamino)-diphenylmethane, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3', 5'-tetraethyl-4,4'-diamiodiphenylmethane, and amine aldehyde condensation products such as the crude polyphenylpolymethylene polyamine mixtures produced from aniline and formaldehyde, and mixtures thereof.

Suitable polyester polyols include, for example, those prepared by reacting a polycarboxylic acid or anhydride with a polyhydric alcohol. The polycarboxylic acids may be aliphatic, cycloaliphatic, araliphatic, aromatic, and/or heterocyclic and may be substituted (e.g. with halogen atoms) and/or unsaturated. Examples of suitable carboxylic acids and anhydrides include succinic acid; adipic acid; suberic acid; azelaic acid; sebacic acid; pthtalic acid; isophthalic acid; terephthalic acid; trimellitic acid; phthalic anhydride; tetrahydrophthalic anhydride; hexahydrophthalic anhydride; tetrachlorophthalic anhydride; endomethylene tetrahydrophthalic anhydride; glutaric acid anhydride; maleic acid; maleic anhydride; fumaric acid; dimeric and trimeric fatty acids, such as those obtained from oleic acid, which may be in admixture with monomeric fatty acids. Simple esters of polycarboxylic acids may also be used in preparing polyester polyols. For example, terephthalic acid dimethyl ester, terephthalic acid bis glycol esters, and mixtures of these.

Examples of polyhydric alcohols suitable for use in preparing polyester polyols include ethylene glycol; 1,3-, 1,4-, 1,2-, and 2,3-butanediols; 1,6-hexanediol; 1,8-octanediol; neopentyl glycol; cyclohexane dimethanol (1,4-bis-bydroxymethyl cyclohexane); 2-methyl-1,3-propanediol; glycerol; mannitiol; sorbitol; methylglucoside; diethylene glycol; trimethylolpropane; 1,2,6-hexanetriol; 1,2,4-butanetriol; trimethylolethane; pentaerythritol; triethylene glycol; tetraethylene glycol; polyethylene glycols; dipropylene glycol; tripropylene glycol; polypropylene glycols; dibutylene glycol; polybutylene glycols; mixtures of these; and the like. The polyester polyols may optionally contain some terminal carboxy groups although preferably they are fully hydroxyl terminated. It is also possible to use polyesters derived from lactones such as caprolactone; or from hydroxy carboxylic acids such as hydroxy caproic acid or hydroxyacetic acid.

A particularly preferred example of an isocyanate-reactive polyol for use in the LD-S-RIM polyol composition is a propylene oxide adduct of glycerol having a nominal functionality of 3 and a number-averaged hydroxyl equivalent weight of 86. This predominantly secondary-OH functional triol is an example of a rigid polyol, as per the description provided hereinabove. It is commercially available from Huntsman Polyurethanes as JEFFOL® G 30-650 polyol. Blends of this preferred polyol with glycerol are also examples of preferred polyol compositions for use in the LD-S-RIM aspect of the invention. In this composition the weight ratio of the JEFFOL® G 30-650 polyol to glycerol is in the range of from about 99:1 to about 50:50, preferably 98:2 to about 90:10, and most preferably about 95:5 to about 90:10. This preferred polyol blend preferably comprises about 70 to 95 and more preferably about 80 to about 100% by weight of the organic isocyanate reactive composition in the reaction system of the invention. These polyol blends are particularly suitable for making the expanded composite moldings according to the LD-S-RIM process.

The term "nominal functionality" applied to polyols, as used herein, denotes the expected functionality of the polyol based upon the raw materials used in its synthesis. The nominal functionality may differ slightly form actual functionality, but the difference may usually be ignored in the context of this invention. The nominal functionality of a polyoxyalkylene polyether polyol is the functionality of the initiator. This is particularly true for polyether polyols that are based predominantly on EO and/or PO (such as the JEFFOL® G 30-650 polyol, described above). The nominal functionality of a pure compound is, of course, the same as its absolute functionality. If a mixed initiator is used, then the nominal functionality of the polyol is the number averaged functionality of the mixed initiator.

In the more preferred two component LD-S-RIM formulations of the invention, the water, along with any other optional supplemental blowing agents, is preferably mixed with the polyol composition in the B-component. The blowing agents (including water) should be used in amounts totaling up to about 20% by weight, preferably about 0.1 to about 15%, more preferably about 0.25 to about 10%, and most preferably 0.4 to 5% by weight relative to the total weight of the B-component of the reaction system. It is preferred that water is the principal blowing agent (which is responsible for all or most of the foaming), and is used at a level of between 0.3% and 3.5% of the B-component, preferably at a level of between 0.35% and 2.5% of the B-component by weight. Ideally, water is the sole blowing agent (responsible for all of the foaming).

The reaction systems of the invention necessarily comprise at least one fatty compound selected from the group consisting of (1) a fatty polyester, (2) a fatty acid ester, and (3) a fatty amide. In general, this compound or mixture of compounds should be present in the reaction system at a level of from about 0.5 to 7%, preferably 1.5 to 5.5%, and still more preferably from 2 to 5% by weight of the total reaction system. The fatty polyester, fatty acid ester, and fatty amide compounds used in the invention are preferably aliphatic compounds free of aromatic groups. The fatty polyester, fatty acid ester, and fatty amide compounds used in the invention are also preferably inert compounds. More specifically, these compounds are preferably free of isocyanate groups, epoxy groups, anhydride groups, salts of carboxylic acid groups, and active hydrogen containing groups such as alcohol groups, carboxylic acid groups, and primary or secondary amine groups. The fatty compound may optionally contain some inert substituents, such as halogen or alkoxy groups bound to carbon atoms along the fatty alkyl chains. But more preferably all the fatty compounds used in the invention will contain only aliphatic hydrocarbon groups containing only carbon and hydrogen atoms, in addition to the ester and/or amide groups. These aliphatic hydrocarbon groups may be saturated, or may optionally contain some unsaturation. The individual fatty hydrocarbon groups on the fatty compounds according to the invention preferably contain 8 or more carbon atoms, more preferably 12 or more carbon atoms. The individual fatty compounds themselves contain at least 10 carbon atoms, preferably at least 12 carbon atoms, more preferably at least 18 carbon atoms, and most preferably 20 carbon atoms or more.

Fatty polyesters are particularly preferred for use in the invention. Suitable fatty polyesters include polyesters having a number averaged molecular weight of from about 500 to about 12,000; preferably about 800 to about 5000; more preferably from about 1000 to about 4000; and most preferably from about 2000 to about 3000. The preferred fatty polyester molecular species contain 4 or more ester groups per molecule, and more preferably 5 or more ester groups on a number averaged basis.

Preferably, the fatty polyesters used in the invention are essentially free of groups reactive toward isocyanates under the conditions of the polymer forming reaction that is used in the processing of the RIM reaction systems according to the invention. The hydroxyl number of the fatty polyester is preferably less than 25, more preferably less than 15, even more preferably less than 10, still more preferably less than 5, and most preferably about 0. The acid number of the fatty polyester is preferably less than 25, more preferably less than 15, even more preferably less than 10, still more preferably less than 5, and most preferably about 0. Most preferably, the fatty polyester is also free of epoxy groups, salts of carboxylic acids groups, or aromatic rings.

Useful fatty polyesters are generally mixed esters comprising the reaction product of three monomers: (i) a monofunctional monomer, (ii) a difunctional monomer, and (iii) a trifunctional monomer (i.e. trifunctional or higher). The reactive "functionality" of these three types of monomers arises from hydroxyl groups, acid, groups, or derivatives thereof. Each of the monomers (i; ii; and iii) may independently comprise from about 2 to 54 and preferably about 2 to about 18 carbon atoms.

Preferably, the fatty polyesters used in the present reaction systems are mixed esters comprising the reaction product of (1) aliphatic dicarboxylic acids, (2) aliphatic polyols, and (3) fatty monocarboxylic acids wherein the monocarboxylic acid comprises about 12 to 30 carbon atoms, preferably about 16 to about 20 carbon atoms. Useful fatty polyesters include those disclosed in, for example, U.S. Pat. Nos. 3,875,096; 5,389,696; and 5,576,409, the subject matter of which are all fully incorporated herein by reference.

More preferably the fatty polyesters utilized in the reaction systems comprise the reaction product of (1) adipic acid, (2) pentaerythritol, and (3) oleic acid. An example of a suitable fatty polyester composition is LOXIOL® G-71S polyester, available commercially from Cognis Corporation [formerly Henkel Corporation].

Fatty acid ester compounds suitable for use in the invention contain at least 22 carbon atoms and preferably at least 31 carbon atoms. The maximum number of carbon atoms in the fatty acid ester compound is limited only where the carbon number causes the material to be incapable of being blended with or dispersed into the polyol composition. The fatty acid ester compounds suitable for use in the invention preferably contain either 1, 2 or 3 ester groups in the molecule. A preferred general class of suitable fatty acid esters include esters of stearic acid, oleic acid, linoleic acid, linolenic acid, adipic acid, behenic acid, arachidic acid, montanic acids, isostearic acid, dimerized fatty acids, and trimerized fatty acids with aliphatic monoalcohols. Another preferred general class of suitable fatty acid ester compounds includes esters of glycerol or ethylene glycol with a fatty aliphatic monocarboxylic acid of from 12 to 20 carbon atoms.

Specific examples of fatty acid ester compounds suitable for use in the invention include butyl stearate, tridecyl stearate, glycerol trioleate, isocetyl stearate, ditridecyl adipate, stearyl stearate, glycerol tri-(12-hydroxy)-stearate, dioctyl dimerate, and ethylene glycol distearate. Preferably the fatty acid ester is devoid of functional groups capable of reacting with isocyanates under the conditions of the RIM polymerization reaction. Most preferably the fatty acid ester is also free of epoxy groups, carboxylic acid groups or salts thereof, or aromatic rings. A particularly preferred fatty acid ester for use in the invention is tridecyl stearate. Commercially available fatty acid esters suitable for use in the present invention include the KEMESTER® brand esters available from Witco Chemical Corporation, including KEMESTER® 5721 ester; KEMESTER® 5822 ester; KEMESTER® 3681 ester; KEMESTER® 5654 ester; and KEMESTER® 1000 ester.

Fatty amide compounds suitable for use in the invention include (1) primary amides comprising at least 18 aliphatic carbon atoms, or (2) secondary or tertiary amides comprising at least 34 aliphatic carbon atoms. The maximum number of carbon atoms in the fatty amide compound is limited only where the carbon number causes the material to be incapable of being blended with or dispersed into the polyol composition. Mixtures may also be used. Suitable compounds include oleamide, stearamide, stearyl stearamide, 2-hydroxyethyl-(12-hydroxyl)-stearamide, and erucyl erucamide. Commercially available fatty amides include the KEMAMIDE® brand fatty amide compounds available from Witco Chemical Corporation. The preferred fatty amides are free of aromatic rings. The most preferred fatty amides are free of hydroxyl groups, primary or secondary amine groups, caboxylic acid groups or salts thereof, or epoxide groups.

The fatty polyesters are particularly preferred for use in the instant invention. Mixtures of the fatty polyesters with fatty acid esters and/or with fatty amides may also be used is desired.

The fatty polyester, the fatty acid ester, and/or the fatty amide compound(s) are preferably incorporated into the reaction systems of the invention by simple blending with the polyol composition and the blowing agent(s) in the B-component. This blending is preferably conducted at ambient temperature (25° C.) or close thereto, since no covalent-bond-forming reaction among these different ingredients in the B-component is desired. The fatty compound(s) need not be soluble in (fully miscible with) the other ingredients in the B-component, but should be at least dispersible with the other B-component ingredients for a time sufficient to permit handling of the final B-component in processing of the reaction system.

Although not wishing to be bound by any theory, there are indications that at least a partial immicibility (i.e. a tendency towards separation, under the conditions used for processing) of the fatty compound in the B-component may be necessary for optimal performance of the inventive reaction system. Therefore, fatty compounds that are completely miscible with the other ingredients in the B-component appear to be somewhat less preferred. It appears that a balance must be struck between limited immicibility of the fatty compound(s), and sufficient dispersibility thereof for processing.

Finally, the RIM processable reaction formulation of the invention must contain a polysiloxane composition. In one particularly preferred embodiment of the invention [Embodiment-A] the polysiloxane composition comprises an effective amount of a polydimethylsiloxane-polyoxyalkylene copolymer having greater than 60 siloxane linkages in its structure. Preferably this copolymer is liquid at 25° C.

Polysiloxane Composition; Embodiment-A:

The polydimethylsiloxane polyoxyalkylene copolymer in Embodiment-A is preferably based on a polydimethylsiloxane main chain with pendant and/or terminal side chains containing the polyoxyalkylene blocks. The pendant and/or terminal polyoxyalkylene blocks attached to the polydimethylsiloxane main chain are themselves preferably hydroxyl or, more preferably, alkyl terminated. The polyoxyalkylene side chains are preferably based on oxyethylene and/or oxypropylene units. More preferably these polyoxyalkylene side chains contain less than 10 mole percent of oxyalkylene residues other than oxyethylene or oxypropylene. Still more preferably these side chains contain both a plurality of oxyethylene and a plurality of oxypropylene units. Most preferably these side chains contain both a plurality of oxyethylene and a plurality of oxypropylene units, and are devoid of other kinds of oxyalkylene units.

The polydimethylsiloxane polyoxyalkylene copolymer of Embodiment-A contains greater than 60 siloxane units on a number averaged basis, more preferably from 65 to 300 siloxane units, still more preferably from greater than 70 to less than 150 siloxane units, even more preferably from greater than 70 to 100 siloxane units, most preferably from 75 to 95 siloxane units, and ideally 80 to 90 siloxane units. The polydimethylsiloxane polyoxyalkylene copolymer molecule preferably consists of from 30 to 80% of its total molecular weight of polydimethylsiloxane (defined as the sum total of dimethylsiloxane [—Si(CH3)2-O—] units in the molecule), more preferably from 35 to 70% of polydimethylsiloxane, still more preferably from 40 to 60% of polydimethylsiloxane, even more preferably from 40 to 55% polydimethylsiloxane, and most preferably from 40 to 50% of polydimethylsiloxane relative to the total molecular weight of the polydimethylsiloxane polyoxyalkylene copolymer.

The preferred number averaged molecular weight for the polydimethylsiloxane polyoxyalkylene copolymer is from 8000 to 20000, more preferably from 10000 to 18000, still more preferably from 11000 to 16000, and even more preferably from 12000 to 15000.

Preferably at least 80% by weight of the non-polydimethylsiloxane portion (nonpolysiloxane portion defined as everything in the molecule that is not a dimethylsiloxane [—Si(CH3)2-O—] unit) of the polydimethylsiloxane polyoxyalkylene copolymer molecule is made up of oxyethylene and oxypropylene units. More preferably, greater than 90% by weight of the non-polydimethylsiloxane portion of the polydimethylsiloxane polyoxyalkylene copolymer molecule is made up of oxyethylene and oxypropylene units. All the oxyalkylene units are preferably incorporated into side chains attached to a polydimethylsiloxane main chain (backbone chain). In the most preferred embodiments of the invention there are from 2 to 8 such polyether side chains per molecule, most preferably 3 to 4. It is most preferred that the polyether side chains are all the same. Preferably, the oxypropylene and oxyethylene units are randomly distributed along the side chains. Preferably, the molar ratio of oxypropylene to oxyethylene units in the polydimethylsiloxane-polyoxyalkylene copolymer molecule is from 1 to 5, preferably from 1.1 to 3, more preferably from 1.2 to 2, still more preferably from 1.25 to 1.75, even more preferably from 1.30 to 1.50, and most preferably from 1.35 to 1.40.

Preferably, the sum of all oxyethylene and oxypropylene units in the molecule constitutes greater than 90 mole percent of all the oxyalkylene units in the molecule. Most preferably, the sum of all the oxyethylene and oxypropylene units in the molecule constitute 100% of all oxyalkylene units in the molecule.

The siloxane backbone is preferably linear, with no siloxane branch points.

An especially preferred class of polydimethylsiloxane polyoxyalkylene copolymers conform to the general structure represented by Formula-IA below:

$$R_3Si\text{—}[O\text{—}SiR'R'']_n[O\text{—}SiR'''R'''']_m\text{-}O\text{—}SiR''''_3, \quad \text{IA.}$$

Wherein the four substituent groups R, R', R", and R"" may be the same or different and at least 80 mole percent, more preferably at least 90 mole percent, of the four groups R, R', R", and R"" are CH3 groups.

The number averaged value of n is from 60 to 500, more preferably from 65 to 300, still more preferably from 67 to 200, even more preferably from 75 to 150, most preferably from 77 to 100, and ideally from 78 to 94.

The value of m is from 2 to 10, more preferably 2 to 8, still more preferably 3 to 6, most preferably 3 to 4.

Preferably, all of the groups R, R', R", and R"" are hydrocarbon groups of 10 carbons or fewer, more preferably all of the groups R, R', R", and R"" are all aliphatic hydrocarbon groups of 4 carbons or fewer, and most preferably all of these groups are CH3 groups.

The groups R"' or R"" may be the same or different. At least one of the groups R"' or R"" is a polyoxyalkylene block according to Formula-IIA, below. More preferably, only one of the two groups R"' and R"" is a polyoxyalkylene block according to Formula-IIA, while the other is an aliphatic hydrocarbon group of 4 carbons or fewer. Still more preferably, only one of the two groups R"' or R"" is a polyoxyalkylene block according to Formula-IIA, while the other is a CH3 group.

$$\text{-L-O—}[PO]_x[EO]_y[AO]_z\text{-O-T,} \quad \text{IIA.}$$

In the structural Formula-IIA above the unit "PO" is an oxypropylene unit, and the unit "EO" is an oxyethylene unit. The unit "AO" represents an optional oxyalkylene unit containing more than three carbon atoms (i.e. an oxyalkylene unit higher than PO). The oxypropylene, oxyethylene, and optional higher order oxyalkylene units may be distributed randomly along the chain in Formula-IIA, as blocks, or any combination thereof.

Although it is within the scope of the invention to incorporate minor amounts of oxyalkylene groups AO, higher than PO and EO, in the substituent formula (Formula-IIA), it is highly preferred that EO and PO are the only oxyalkylene units present in the structure. Therefore the preferred value of z is 0.

If higher oxyalkylene units AO are present in Formula-IIA at all, the higher order oxyalkylene units should preferably contain fewer than 6 carbon atoms and the ratio of z to the quantity (x+y+z) should preferably be less than 1/5. More preferably, the ratio of z to the quantity (x+y+z) is less than 1/8, still more preferably less than 1/10, and even more preferably less than 1/15. The ideal value of this ratio is 0.

Preferably, the PO (oxypropylene) units in the structure shown in Formula-IIA are selected from the group consisting of —CH2-CH(CH3)-O—, —CH(CH3)-CH2-O—, and combinations thereof. More preferably the PO units in Formula-IIA are predominantly —CH2-CH(CH3)-O—. Ideally the PO units in Formula-IIA are entirely —CH2-CH(CH3)-O—.

The value of x in Formula-IIA is from 10 to 50, preferably from 15 to 30, more preferably from 18 to 25, most preferably from 20 to 24, and ideally from 21 to 23.

The value of y in Formula-IIA is from 8 to 40, preferably from 10 to 25, more preferably from 12 to 20, most preferably from 14 to 18, and ideally from 15 to 17.

The ratio of x/y in Formula-IIA is from 1 to 5, preferably from 1.1 to 3, more preferably from 1.2 to 2, most preferably from 1.25 to 1.75, still more preferably from 1.30 to 1.50, and ideally from 1.35 to 1.40.

Most preferably, the PO and EO units in Formula-IIA are randomly distributed. The group L in Formula-IIA is an optional divalent linking group that links the substituent chain (represented by Formula-IIA) to the polysiloxane main chain (Formula-IA). In a less preferred embodiment of the invention, L is not present at all. In this less preferred embodiment, the linking group is simply the oxygen atom (at the left side of Formula-IIA), which is then directly bonded to a silicon atom in the polysiloxane main chain.

It is preferred to have an organic divalent linking group L in Formula-IIA. The organic linking group L preferably has fewer than 20 carbon atoms, more preferably greater than 1 but fewer than 10 carbons, and most preferably greater than 2 but fewer than 5 carbon atoms. The more preferred organic linking groups L are divalent aliphatic hydrocarbon groups. The divalent aliphatic hydrocarbon groups are preferably simple polymethylene groups containing two to four —CH2-units. The ideal linking group L is trimethylene [—CH2CH2CH2-].

It is most preferred that the bond between the substituent chain (represented by Formula-IIA) and the polysiloxane main chain (Formula-IA) is a hydrolysis resistant bond such as an Si-C bond. This preferred type of hydrolysis resistant bond is provided when the linking group L in Formula-IIA is present and is a divalent hydrocarbon group having at least two carbon atoms.

The terminal group T in Formula-IIA is selected from the group consisting of H, and hydrocarbon groups of less than 20 carbon atoms. The terminal group T is preferably an aliphatic hydrocarbon group of 18 carbon atoms or less. More preferably, the group T is an aliphatic hydrocarbon group of less than 10 carbon atoms. Still more preferably, the group T is an aliphatic hydrocarbon group of less than 5 carbon atoms. Most preferably, the group T is a hydrocarbon group containing 1 or 2 carbons. Ideally the group T is CH3. Combinations of different groups T may be used in the same molecule, if desired.

Mixtures of two or more different polydimethylsiloxane-polyoxyalkylene copolymers may of course be used if desired, provided the individual copolymers each conform to the structural constraints noted.

All of the values of the structural parameters pertaining to the polydimethylsiloxane-polyoxyalkylene copolymer (and in particular the copolymer according to Formula-IA), the constraints placed upon the parameters, and the comparisons made between the parameters, are on a number averaged basis unless otherwise indicated. However, it is even more preferred that all the structural parameters, the constraints placed upon the structural parameters and comparisons made between the parameters (as discussed above), should also hold on an absolute basis (for the individual molecules of the copolymer used in the reaction system of the invention).

Examples of two particularly preferred polydimethylsiloxane-polyoxyalkylene copolymers for use in this invention are NIAX L-550 surfactant and NIAX L-560 surfactant, which are both silicone surfactants available commercially from Crompton Corporation. The loading of the polydimethylsiloxane-polyoxyalkylene ingredient of Embodiment-A, relative to the total RIM processable reaction system, should be an amount effective to achieve the desired reduction in mold residence time without unwanted defects in the molded articles. In practice, this amount will generally be between 0.1 and 5% by weight (measured relative to the total reaction system weight), preferably between 0.15 and 4%, more preferably between 0.18 and 3%, still more preferably between 0.2 and 2.5%, even more preferably between 0.2 and 2.2%, most preferably between 0.2 and 2%, and ideally between 0.3 and 0.5%. The polydimethylsiloxane-polyoxyalkylene copolymer in Embodiment-A may be incorporated into the reaction system via the isocyanate component, the isocyanate reactive component, or any combination thereof. It may optionally also be incorporated in whole or in part as a separate stream (i.e. a third stream). This copolymer is most typically incorporated into the reaction system entirely via the isocyanate reactive component.

In another embodiment of the invention [Embodiment-B] the polysiloxane composition comprises an effective amount of a combination of at least one polydimethylsiloxane polyoxyalkylene copolymer containing 60 siloxane linkages or fewer, and at least one polydimethylsiloxane fluid.

Polysiloxane Composition; Embodiment-B:

The polysiloxane composition in Embodiment-B contains a combination of two different types of polysiloxane species. Both species must of course be present in amounts sufficient to achieve the desired effect of reduced mold residence time without unwanted defects in the molded articles.

In this embodiment of the invention the reaction systems must comprise a polydimethylsiloxane fluid. This fluid is preferably a simple polydimethylsiloxane oil that is liquid at 25° C. and contains no functional groups or organic side chains other than methyl groups. The polydimethylsiloxane fluid is most preferably a linear polydimethylsiloxane of the following general structure (Formula IB):

    IB.

However, it is within the scope of the invention to incorporate a polydimethylsiloxane fluid that contains branches in the siloxane backbone. These siloxane branch points would be of the form:

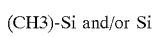

wherein the remaining valences on the tetravalent silicon atoms shown are understood to be satisfied by siloxane linkages to other tetravalent silicon atoms.

Although it is preferred that the polydimethylsiloxane fluid should contain only methyl substituents, as shown above, it is within the scope of the invention to use polydimethylsiloxanes which contain minor amounts of organic non-siloxane-containing substituents other than methyl groups. In this less preferred alternative the non-methyl organic substituents on the siloxane chain should each contain less than 20 carbon atoms, preferably less than 10 carbon atoms, more preferably less than 5 carbon atoms, and most preferably less than 3 carbon atoms. In addition, any non-methyl organic substituents on the siloxane chain should collectively comprise less than 20% of the total molecular weight of the polydimethylsiloxane fluid on a number averaged basis, preferably less than 15%, more preferably less than 10%, still more preferably less than 8%, even more preferably less than 5%, and most preferably less than 3% of the total molecular weight of this fluid. The polydimethylsiloxane fluid may contain isocyanate reactive groups, but it is preferred that it contain no groups which are reactive toward either isocyanates, or toward any of the isocyanate reactive species present in the RIM reaction system, under the conditions used for the polymerization of the reaction system or for the preparation or storage of the liquid components.

In the preferred embodiment, when the polydimethylsiloxane fluid is a linear fluid containing only methyl substituents, as shown in the linear structure above, the value of "n" should preferably be between 0 and 5000, preferably between 1 and 1000, more preferably between 1 and 500, still more preferably from 3 to 500. The value of the parameter "n" is limited primarily by compatibility with the polyol composition at the higher end and by flammability at the lower end. It is preferred that the polydimethylsiloxane fluid be at least stably dispersible in the polyol composition and have a boiling point at 1 atmosphere pressure of greater than 150° C. Examples of suitable linear polydimethylsiloxane fluids having only methyl substituents include the DC-200® series of products from Dow Corning Corporation. The DC-200® series covers a range of viscosities. These commercial products are sold by viscosity. The preferred viscosity range at 25° C. is from 5 cst (centistokes) to 5000 cst, more preferably from 10 cst to 200 cst, still more preferably from 50 to 150 cst. The 100 cst DC-200® product is particularly preferred. The 5 cst product is suitable but somewhat less preferred due to its greater tendency to cause unwanted de-foaming of the RIM systems of the invention in some processing situations.

The preferred molecular weight of the polydimethylsiloxane fluid should be between 200 and 200,000; preferably between 300 and 100,000; more preferably between 350 and 50,000; and most preferably from 370 to 10,000.

Mixtures of different polydimethysiloxane fluids may be used if desired, provided that they individually conform to the structural constraints noted.

All of the values of the structural parameters pertaining to the polydimethylsiloxane fluid in this Embodiment-B, the constraints placed upon the parameters, and the comparisons made between the parameters, are on a number averaged basis unless otherwise indicated. However, it is even more preferred that all the structural parameters, the constraints placed upon the structural parameters and comparisons made between the parameters (as discussed above), should also hold on an absolute basis (for the individual molecules of the polydimethylsiloxane fluid used in the reaction system of the invention).

The polydimethylsiloxane fluid may be incorporated into the RIM processable reaction system via the A-component with the polyisocyanate and/or via the B-component with the organic isocyanate reactive composition. It may also optionally be incorporated as an extra stream. It is preferred, however, to incorporate this fluid entirely into the B-component. The preferred total loading of the polydimethylsiloxane fluid in Embodiment-B, as a percent by weight of the total RIM processable reaction system, is between 0.01% and 5%, more preferably between 0.02% and 4%, still more preferably between 0.02% and 2.5%, even more preferably between 0.02% and 2%, most preferably between 0.02% and 1.7%, and ideally from 0.04 to 1.7%.

Finally, the RIM processable reaction formulation according to Embodiment-B comprises at least one polydimethylsiloxane-polyoxyalkylene copolymer having 60 siloxane linkages or fewer, preferably 50 siloxane units or fewer, on a number averaged basis. Preferably this copolymer is liquid at 25° C. The polydimethylsiloxane polyoxyalkylene copolymer is preferably based on a polydimethylsiloxane based main chain with pendant and/or terminal side chains containing the polyoxyalkylene blocks. The pendant and/or terminal polyoxyalkylene blocks attached to the polydimethylsiloxane main chain are themselves preferably hydroxyl or alkyl terminated; with alkyl termini, of 1 to 6 carbon atoms, being the more preferred end groups. The polyoxyalkylene blocks are preferably based on oxyethylene and/or oxypropylene units. The more preferred polyoxyalkylene blocks contain both oxyethylene and oxypropylene units, most preferably in a random distribution. A preferred class of polydimethylsiloxane polyoxyalkylene copolymers for Embodiment-B conform to the general structure represented by Formula-IIB below:

R3Si—[O—SiR2]n-O—SiR3,  IIB.

Wherein at least 70 mole percent, more preferably at least 80 mole percent, of the "R" groups are CH3 groups; at least two of the "R" groups comprise polyoxyalkylene blocks; and the number averaged value of n is between 10 and 59, more preferably between 10 and 49, still more preferably between 12 and 35, even more preferably between 15 and 25, and most preferably from 17 to 22. In the embodiment of Formula-IIB the subset of groups "R" which bear the polyoxyalkylene blocks collectively comprise greater than 50% of the total molecular weight of the polydimethylsiloxane-polyoxyalkylene copolymer on a number averaged basis, preferably from 60% up to 82%, and more preferably from 67% up to 80% of the total molecular weight of the copolymer. The number averaged molecular weight of the polydimethylsiloxane-polyoxyalkylene copolymer in the embodiment represented by Formula-IIB is between 2000 and 25,000; preferably between 2500 and 20,000; more preferably between 3000 and 15,000; still more preferably between 3000 and 10,000; even more preferably between 3200 and 8000; and most preferably between 3200 and 7500.

In a more preferred variation of the polydimethylsiloxane polyoxyalkylene copolymer represented in Formula-IIB, the polyoxyalkyene chains contain at least 70 mole percent, and more preferably at least 80 mole percent, of oxyethylene and/or oxypropylene units, as calculated on a number averaged basis relative to the collective molecular mass of the polyoxyalkylene chains within the structure of Formula-IIB. By "number averaged basis" in this context it is understood that the sum of the number averaged molecular weights of all the oxyethylene and oxypropylene units present within all the polyoxyalkylene chains within Formula-IIB are compared to the total number averaged molecular weight of all the polyoxyalkylene chains in Formula-IIB.

In a still more preferred embodiment, the molar ratio of oxyethylene to oxypropylene units within the polyoxyalkylene chains in the polydimethylsiloxane-polyoxyalkylene copolymer of Formula-IIB are between 20:80 and 80:20, more preferably 30:70 to 70:30, still more preferably 40:60 to 60:40, and most preferably 50:50 to 60:40. The oxyethylene and oxypropylene units within these polyoxyalkylene chains are preferably randomly distributed. The polyoxyalkylene chains are preferably terminated either with hydroxyl groups, alkyl groups of 1 to 5 carbon atoms, or a combination thereof. The polyoxyalkylene chains are most preferably terminated with alkyl groups of 1 to 4 carbon atoms.

In the most preferred embodiment of Formula-IIB, two of the polyoxyalkylene chains in the polydimethylsiloxane-polyoxyalkylene copolymer are attached to separate terminal silicon atoms on the polydimethylsiloxane chain. In this most preferred embodiment of Formula-IIB, the total number of R groups bearing polyoxalkylene chains is 2 or 3, and all other R groups are CH3.

Another highly preferred embodiment of the polydimethylsiloxane-polyoxyalkylene copolymer is represented by Formula-IIIB below:

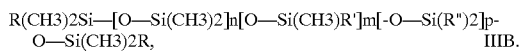

R(CH3)2Si—[O—Si(CH3)2]n[O—Si(CH3)R']m[-O—Si(R")2]p-O—Si(CH3)2R,　　　　　　　　　　　　　　　　　　　IIIB.

Wherein:
the terminal groups R, attached to the terminal silicon atoms as shown, may be the same or different and each contains a polyoxyethylene-polyoxypropylene block;
the groups R' may be the same or different and are selected from the group consisting of R, and —[O—Si(CH3)2]q-O—Si(CH3)2T, wherein T is selected from the group consisting of CH3 and R, and R is as previously defined;
the groups R" may be the same or different and are selected from the group consisting of R and —[O—Si(CH3)2]s-O—Si(CH3)2T, wherein T is selected from the group consisting of CH3 and R, and R is as previously defined;
n is from 2 to 59, preferably from 10 to 49, more preferably from 12 to 45, still more preferably from 15 to 35, even more preferably from 15 to 25, and most preferably from 17 to 22;
m is from 0 to 3, preferably from 0 to 2, and more preferably either 0 or 1;
p is from 0 to 3, preferably from 0 to 2, and more preferably either 0 or 1;
q is from 2 to 59, preferably from 10 to 49, more preferably from 12 to 45, still more preferably from 15 to 35, even more preferably from 15 to 25, and most preferably from 17 to 22;
s is from 2 to 59, preferably from 10 to 49, more preferably from 12 to 45, still more preferably from 15 to 35, even more preferably from 15 to 25, and most preferably from 17 to 22;
the sum of: n+m+p+q+s is from 5 to 59, preferably from 10 to 49, more preferably from 12 to 40, still more preferably from 15 to 30, and most preferably from 17 to 28; and
the sum of: m+p is from 0 to 5, preferably from 0 to 3, more preferably from 0 to 2, and most preferably either 0 or 1.
The preferred structure for the groups R in Formula-IIIB are represented by general Formula-IVB below:

-L-(EO)x-(PO)y-R''',　　　　　　　　　　　　　　　IVB.

Wherein L is a divalent linking group selected from the group consisting of oxygen; sulfur; and divalent organic groups of 10 carbons or fewer, preferably 5 carbons or fewer. In a preferred embodiment L is oxygen.
Further, wherein EO is understood to the an oxyalkylene group [—CH2CH2-O—] and PO is understood to be an oxypropylene group [selected from the group consisting of —CH2CH(CH3)-O—; —CH(CH3)CH2-O—; or a combination of these isomeric structures];
R''', the group bonded to the terminal oxygen in Formula-IVB, is selected from the group consisting of —H, and —R""; wherein R"" is a monovalent organic group of 8 carbons or less, and is preferably an alkyl group of 1 to 5 carbons;
x is from 10 to 30, preferably from 15 to 25, and more preferably from 17 to 22;
y is from 8 to 28, preferably from 11 to 24, and more preferably from 13 to 20.

The EO/PO block represented in Formula-IVB is preferably a random copolymer of EO and PO units.

The number averaged molecular weight of the polydimethylsiloxane-polyoxyalkylene copolymer in the embodiment represented by Formula-IIIB is between 2000 and 25,000; preferably between 2500 and 20,000; more preferably between 3000 and 15,000; still more preferably between 3000 and 10,000; even more preferably between 3200 and 8000; and most preferably between 3200 and 7500.

The preferred total number of polyoxyalkylene-containing chains R in Formula-IIIB is 2 to 4, more preferably 2 to 3, on a number averaged basis. The polyoxyalkylene chains R in Formula-IIIB are preferably all the same. The most preferred polydimethylsiloxane-polyoxyalkylene structure according to Formula-IIIB contains 0 to 1 siloxane branch points.

The molar ratio of EO units to PO units in each of the polyoxyalkylene-containing chains R in Formula-IIIB is preferably in the range of 50:50 to 60:40.

Preferably, the groups R which bear the polyoxyalkylene blocks collectively comprise greater than 50% of the total molecular weight of the polydimethylsiloxane-polyoxyalkylene copolymer of Formula-IIIB on a number averaged basis, preferably from 60% up to 82%, and more preferably from 67% up to 80% of the total molecular weight of the copolymer. By "number averaged basis" it is understood that the sum of the number averaged molecular weights of all the groups R in the structure of Formula-IIIB is compared to the total number averaged molecular weight of the polydimethylsiloxane-polyoxyalkylene copolymer represented by Formula-IIIB.

Mixtures of two or more different polydimethylsiloxane-polyoxyalkylene copolymers may be used if desired, provided that the individual copolymers conform to the structural constraints noted.

All of the values of the structural parameters pertaining to the polydimethylsiloxane-polyoxyalkylene copolymer in Embodiment-B (as in Embodiment-A), the constraints placed upon the parameters, and the comparisons made between the parameters, are on a number averaged basis unless otherwise indicated. However, it is preferred that all the structural parameters, the constraints placed upon the structural parameters and comparisons made between the parameters (as discussed above), should also hold on an absolute basis (for the individual molecules of the said copolymer used in the reaction system of the invention).

An example of a particularly preferred polydimethylsiloxane-polyoxyalkylene copolymer, suitable for use in the improved RIM formulations according to Embodiment-B, is TEGOSTAB® B-1400A surfactant. This product is commercially available from the Th. Goldschmidt Corporation.

As in the case of the polydimethylsiloxane fluid ingredient discussed previously, the polydimethylsiloxane-polyoxyalkylene copolymer ingredient may be incorporated into the LD-S-RIM reaction formulation of the invention by way of either the A-component, the B-component, or a combination of both. Optionally this copolymer may be introduced into the reaction system, in whole or in part, as a separate stream during processing. However it is most typical to introduce this ingredient into the reaction system entirely via the B-component.

The loading of the polydimethylsiloxane-polyoxyalklene copolymer ingredient in the total RIM processable reaction system according to Embodiment-B should be between 0.1 and 5% by weight (measured relative to the total reaction system weight), preferably between 0.15 and 4%, more preferably between 0.18 and 3%, still more preferably between 0.2 and 2.5%, even more preferably between 0.2 and 2.2%, most preferably between 0.2 and 2%, and ideally between 0.3 and 0.5%.

In the context of either Embodiment-A or Embodiment-B of the polysiloxane composition according to the reaction system of the invention there may be situations in which it is desirable to place all or part of the polysiloxane ingredients into the isocyanate component (A-component) and/or to introduce them as independent streams during processing. An example of such a situation is wherein the polysiloxane composition, or a component thereof, contains hydrolytically unstable Si—O—C linkages. Such linkages may not survive prolonged contact with the organic polyol ingredients, particularly if water is present.

It is within the scope of the invention to use mixtures of several different polysiloxane species, the mixtures not specifically discussed hereinabove. It would, for example, be within the scope of the invention to use a mixture of a polysiloxane composition according to Embodiment-A together with a polysiloxane composition according to Embodiment-B, provided that the individual components within the mixture are present at levels consistent with the production of RIM molded parts at reduced mold residence times and without defects.

The reaction systems of the present invention may be processed by any conventional method that will be evident to one skilled in the art. For example, the polyisocyanate component (A component) of the reaction system may be mixed with the isocyanate reactive B component in any conventional low or high pressure impingement mixing machines known in the art.

The reaction formulation may further comprise conventionally used additives such as flame retardants, internal mold release agents, particulate fillers, pigments, foam stabilizers, other types of surfactants, combinations of these, and other conventional additives known in the art.

Useful flame retardants include phosphonates, phosphites, and phosphates, such as tris-(2-chloroisopropyl) phosphate (TCPP), dimethyl methyl phosphonate, ammonium polyphosphate, and various cyclic phosphates and phosphonate esters known in the art. Other useful fire retardants include halogen-containing compounds known in the art such as brominated diphenyl ether and other brominated aromatic compounds; melamine and compounds of melamine; antimony oxides such as antimony pentoxide and antimony trioxide; zinc compounds such as zinc oxide; alumina trihydrate; and magnesium compounds such as magnesium hydroxide. The fire retardants may be used in any suitable amount that will be evident to those skilled in the art. However, it is preferred that the fire retardants be used in an amount of 0 to 55%, preferably 0 to 25%, by weight of the B-component. The types of flame retardants most preferred in this application are liquid and soluble flame retardants, as opposed to solid fillers.

Other conventional additives which are known in the art and may be used in the reaction systems of the invention include fillers such as calcium carbonate, silica, mica, wollastonite, wood flour, melamine, short glass or mineral fibers (short enough to be incorporated into the liquid reaction streams as fillers), glass or plastic microshperes, pigments, surfactants, and plasticizers. Such optional additives will be used in amounts that will be evident to those skilled in the art.

In the most preferred aspect of the invention, the reaction system is used in combination with at least one fibrous mat reinforcing structure wherein the mat reinforcing structure is preplaced within a mold cavity before the reaction system is introduced into the mold. This mat reinforcing structure is porous, and is penetrated by the liquid reaction mixture, fills the mold by foaming, and cures to form an expanded LD-S-RIM composite molded article.

Examples of optional supplemental internal mold release agents suitable for use in the invention include carboxylic acid compounds, especially aliphatic fatty carboxylic acids such as oleic acid, lauric acid, stearic acid, hydroxystearic acid, linolenic acid, linoleic acid, montanic acids, ricinoleic acid, tall oil fatty acids, fatty dimer and trimer acids such as those derived from oligomerization of oleic acid, mixtures of these, and the like. Other carboxylic acids which may be used as internal mold release agents include adipic acid and terephthalic acid. The carboxylic acids work synergistically with the fatty polyester, fatty acid ester, and/or fatty amide ingredient (described previously) to provide excellent internal mold release properties. Use of the optional supplemental carboxylic acids is therefore highly preferred. The use of free carboxylic acids in the reaction system can also contribute to foam expansion (blowing), as noted previously.

In the most preferred LD-S-RIM aspect of the invention, these optional carboxylic acid ingredients are preferred additives, and are preferably employed at loadings of from about 0.5 to about 5%, more preferably from about 1.5 to 2.5%, and most preferably from about 1.8% to about 2.2% of the total reaction system. More information about formulations of internal mold release packages for S-RIM is provided in, for example, U.S. Pat. No. 5,576,409.

Examples of pigments that are optionally, but commonly, used in RIM processable systems include carbon black, which is often used as a dispersion in the B-component. Carbon black may be introduced as a concentrated dispersion in a polyol. It is within the scope of the invention, although optional, to employ additional surfactants, such as foam stabilizing surfactants, in the reaction system. These optional additional surfactants may comprise polysiloxane based surfactants, including copolymers, structurally different from the essential polysiloxane composition. The optional additional surfactants may also optionally comprise non-siloxane containing surfactants. The optional additional surfactants may be anionic, cationic, nonionic, zwitterionic, or combinations thereof.

The present invention is still further directed to a process for producing molded articles employing the reaction systems of the invention.

Parts prepared using the RIM processable reaction formulation of the invention are preferably prepared with a reinforcement mat pre-placed in the mold. The reaction system is mixed by means of a RIM machine and the resulting liquid mixture is then injected over the mat. The resulting part is a mat reinforced structural composite having a cellular (foamed) morphology. This is the preferred "LD-S-RIM" aspect of the invention.

Although the use of mats is highly preferred as the reinforcing structures of choice, it is within the scope of the invention to use other types of pre-placed reinforcing structures during LD-S-RIM composite processing. These alternatives include, but are not limited to, masses of individual long fibers, metal reinforcing rods or wires, metal screens, other porous fibrous preforms, combinations of these, and the like.

It is within the scope of the invention to use no reinforcement at all, and to thereby produce unreinforced expanded RIM processed moldings.

It is also within the broad scope of the invention to use short reinforcing fibers, introduced via one or more of the reactive liquid chemical components, or to use chopped fibers introduced at the mix head when the reactive precursors of the molded part are combined. These alternative reinforcing means may optionally be used alone, in combination with each other, and/or in combination with a pre-placed reinforcing mat structure.

The reaction systems of the present invention may be used, when operating in the LD-S-RIM aspect of the invention, with any reinforcement mat conventionally used in the S-RIM art. Suitable reinforcement mats include woven or non-woven structural fibers such as glass, carbon, metal, graphite, silicon carbide, alumina, titania, boron, cellulosic, lignocelluosic, aromatic polyamide, polyester, polyolefin, Nylon, mixtures thereof, and the like. The final reinforced molded LD-S-RIM article may contain between 0.5 and about 95% by weight and preferably from about 10 to about 70% by weight of the reinforcing material. A typical automobile door panel, produced by the LD-S-RIM process using the reaction systems of the invention, normally contains from about 15% to about 25% glass mat by weight (of the total weight of the glass-reinforced composite).

The diameter of the fibers is not critical and may, for example, vary from about 0.001 to about 1.0 mm. The mat may be optionally pretreated with sizing agents, coatings, adhesion promoters, and other kinds of surface treatments known in the art. Glass mat is the preferred structural reinforcement material.

The individual fibers in the reinforcing fiber mats used are preferably equal to or greater than 0.5 inches in length on average, more preferably greater than 2 inches, still more preferably greater than 3 inches, and most preferably 6 or more inches in length on average. The fibers that make up the reinforcing mats, used in the preferred LD-S-RIM aspect of the invention, may be several feet or more in length (essentially continuous fibers).

In the process for producing the molded articles according to the invention, the surfaces of the molds should most preferably be pre-treated with known external mold release agents or mixtures thereof. For example, the mold surfaces may be treated with conventional external mold release agents such as soaps, waxes (e.g. carnuba wax, montan wax, etc.), and mixtures thereof. It is preferred that the external mold release agent(s) used have a high melting point and demonstrate little or no transfer to the molded parts. The melting point of the external release agent used should preferably be at least 6° C. higher than the mold temperature employed in the molding operation. The mold should preferably be cleaned to bare metal before the external mold release coating is applied.

It has been unexpectedly and very surprisingly observed that the use of the RIM processable reaction systems according to the invention dramatically reduce the post blow phenomena which have limited the utility of prior art reactively processed polyurethane urea RIM systems. These improvements have made it possible to reduce mold residence times to less than 65 seconds (measured from the time of completed injection), and in some cases to 60 seconds or less without compromising part quality or increasing scrap rate. Such large reductions in the minimum mold residence time, relative to the prior art, have made substantial improvements to the large scale production economics of industrially important RIM processes, such as LD-S-RIM, by reducing cycle times per part in long production runs.

Because of its ability to form adhesive bonds, the RIM processable systems of the invention, like those of the prior art, are suitable for use in pour-behind applications. The moldings made from the formulations according to the invention show excellent adhesion, for example, to vinyl facings.

The chemical reaction systems according to the invention are suitable for molding polyurethane urea parts according to the RIM process, with considerably reduced overall cycle time per part. This reduction in cycle time is due to a reduction in the minimum mold residence time below 105 seconds, as measured from the time that the injection (or pouring) of the reaction system is completed. Mold residence times of 65 seconds or less can be achieved by using the reaction systems according to the invention. This reduced mold residence time is achieved without sacrificing part quality or increasing scrap rate. Parts molded by using the inventive reaction systems, using the reduced mold residence times noted above, are substantially free of post blow damage such as splits and are likewise substantially free of surface-visible defects (voids/bubbles/blisters) of one half inch or more across (even in pour-behind applications). This high level of part quality, achieved by using the reaction systems according to the invention, is such that the scrap rates in multi-part production operations does not increase as the mold residence times are decreased below 105 seconds, even for geometrically complex moldings such as glass mat reinforced interior door panels. Preferably, the scrap rate does not increase even when the mold residence time is reduced below 100 seconds, more preferably below 90 seconds, still more preferably below 80 seconds, even more preferably below 70 seconds, and ideally below 65 seconds. Special adjustments to the processing conditions are generally not necessary for realizing the benefits of this invention. The improvements noted above are generally achieved under the same process conditions as used in the prior art.

It has been unexpectedly and surprisingly found that the RIM processable reaction systems according to the invention enable significant reductions in mold residence times without increased scrap rates, thereby providing for dramatic improvements in overall productivity on existing process equipment.

The present invention will now be demonstrated by the following non-limiting examples.

EXAMPLES

Glossary:
1) DABCO® 8800 catalyst: Is a proprietary delayed-action tertiary amine based catalyst formulation, available from Air Products and Chemicals Corporation.
2) DABCO® 33LV catalyst: Is 33% 1,4-diaza-bicyclo [2.2.2]octane in 67% dipropylene glycol, available from Air Products and Chemicals Corporation.
3) DABCO® DC5604 catalyst: Is a proprietary silicone surfactant composition, believed to contain polydimethylsiloxane-polyoxyalkylene copolymers with less than 60 siloxane linkages, available from Air Products and Chemicals Corporation.
4) DALTOLAC® R230 polyol: Is a polyether polyol of hydroxyl number 575, available from Huntsman Corporation.
5) DC® 200/100: Is a polydimethylsiloxane fluid, available from Dow Corning Corporation.

6) DR2205: Is a pigment concentrate, comprising a polyester polyol and dispersed carbon black, available from Plasticolor Corporation.
7) JEFFCAT® DMCHA catalyst: Is N,N-dimethyl cyclohexylamine, available from Huntsman Petrochemical Corporation.
8) JEFFCAT® PMDETA catalyst: Is pentamethylenediethyltriamine, available from Huntsman Petrochemical Corporation.
9) JEFFOL® G30-650 polyol: Is a propoxylated glycerol of hydroxyl number 650, available from Huntsman Petrochemical Corporation.
10) KEMESTER® 5721 tridecyl octadecanoate: Is tridecyl octadecanoate, available from Witco Corporation.
11) L00.099: Is an experimental fatty polyester, manufactured by Uniqema Division of ICI Corporation.
12) LOXIOL® G71S polyester: Is a fatty polyester, available from Cognis Corporation.
13) NIAX® L540 surfactant: Is a proprietary silicone surfactant composition, believed to contain polydimethylsiloxane-polyoxyalkylene copolymer with greater than 70 but less than 150 siloxane linkages, available from Crompton Corporation.
14) NIAX® L550 surfactant: Is a proprietary silicone surfactant composition, believed to contain polydimethylsiloxane-polyoxyalkylene copolymer with greater than 70 but less than 150 siloxane linkages, available from Crompton Corporation.
15) NIAX® L560 surfactant: Is a proprietary silicone surfactant composition, believed to contain polydimethylsiloxane-polyoxyalkylene copolymers with greater than 70 but less than 150 siloxane linkages, available from Crompton Corporation.
16) NIAX® L3001 surfactant: Is a proprietary silicone surfactant composition, believed to contain polydimethylsiloxane, available from Crompton Corporation.
17) NIAX® L5340 surfactant: Is a proprietary silicone surfactant composition, believed to contain polydimethylsiloxane-polyoxyalkylene copolymers, available from Crompton Corporation.
18) NIAX® L6980 surfactant: Is a proprietary silicone surfactant composition, believed to contain polydimethylsiloxane-polyoxyalkylene copolymers with less than 60 siloxane linkages, available from Crompton Corporation.
19) POLYCAT® 8 catalyst: Is N,N-dimethyl cyclohexylamine, available from Air Products and Chemicals Corporation.
20) Polyol A: Is ethoxylated glycerine of hydroxyl number 660.
21) PRIOLUBE® 1414 isobutyl oleate: Is isobutyl oleate, available from Uniqema Division of ICI Corporation.
22) PRIOLUBE® 1445 polyester: Is a fatty polyester, available from Uniqema Division of ICI Corporation.
23) PRIOLUBE® 1929 polyester: Is a fatty polyester, available from Uniqema Division of ICI Corporation.
24) PRIOLUBE® 2046 polyester: Is a fatty polyester, available from Uniqema Division of ICI Corporation.
25) PRIOLUBE® 3967 polyester: Is a fatty polyester, available from Uniqema Division of ICI Corporation.
26) PRIOLUBE® 3986 polyester: Is a fatty polyester, available from Uniqema Division of ICI Corporation.
27) REACTINT® X77 colorant: Is a proprietary polymeric colorant, available from Milliken Chemical.
28) RUBINATE® 8700 isocyanate: Is a high functionality mixture of diphenylmethane diisocyanates and polymethylene polyphenyl polyisocyanates, available from Huntsman Polyurethanes. RUBINATE® 8700 isocyanate has a free isocyanate group content of 31.5% by weight and a number average isocyanate group functionality of 2.7.
29) TEGOSTAB® B1400A copolymer: Is a polydimethylsiloxane-polyoxyalkylene copolymer believed to have less than 60 siloxane units, available from Th. Goldschmidt Corporation.
30) TEGOSTAB® B8110 surfactant: Is a proprietary silicone surfactant composition, believed to contain polydimethylsiloxane-polyoxyalkylene copolymer with greater than 60 to less than 150 siloxane linkages, available from Th. Goldschmidt Corporation.
31) TEGOSTAB® B8228 surfactant: Is a proprietary silicone surfactant composition, believed to contain polydimethylsiloxane-polyoxyalkylene copolymer with greater than 60 to less than 150 siloxane linkages, available from Th. Goldschmidt Corporation.
32) TEGOSTAB® B8240 surfactant: Is a proprietary silicone surfactant composition, believed to contain polydimethylsiloxane-polyoxyalkylene copolymer with greater than 60 to less than 150 siloxane linkages, available from Th. Goldschmidt Corporation.
33) TEGOSTAB® B8418 surfactant: Is a proprietary silicone surfactant composition, believed to contain polydimethylsiloxane-polyoxyalkylene copolymer with less than 60 siloxane linkages, available from Th. Goldschmidt Corporation.
34) TEGOSTAB® B8444 surfactant: Is a proprietary silicone surfactant composition, believed to contain polydimethylsiloxane-polyoxyalkylene copolymer with less than 60 siloxane linkages, available from Th. Goldschmidt Corporation.
35) TEGOSTAB® B8454 surfactant: Is a proprietary silicone surfactant composition, believed to contain polydimethylsiloxane-polyoxyalkylene copolymer with less than 60 siloxane linkages, available from Th. Goldschmidt Corporation.
36) TEGOSTAB® B8465 surfactant: Is a proprietary silicone surfactant composition, believed to contain polydimethylsiloxane-polyoxyalkylene copolymer with less than 60 siloxane linkages, available from Th. Goldschmidt Corporation.
37) TEGOSTAB® B8870 surfactant: Is a proprietary silicone surfactant composition, believed to contain polydimethylsiloxane-polyoxyalkylene copolymer with greater than 60 to less than 150 siloxane linkages, available from Th. Goldschmidt Corporation.
38) UNITOL® DSR fatty acid: Is a Tall Oil fatty acid composition, available from Union Camp Corporation.

The following two lists outline the general laboratory apparatus and procedure developed to evaluate the fast demold performance of foamed molded articles. This specific procedure will be referenced as the fast demold protocol. All compositions are by weight unless otherwise indicated.

Apparatus
1. Balance—a minimum of 1000 g. capacity, accuracy of at least 0.1 g.
2. Mixer—capable of 2500 RPM.
3. Mixing Blade—A 2 in. (5 cm) ITC (Intensive Type Cutter) "Conn & Co." blade.
4. Timer—capable of measuring seconds.
5. Cups—Dixie 12 oz. Hot Cup (420 ml).
6. Laboratory press—capable of the following:
   achieving a 25,000-lb (110,000-N) compressive force
   accommodating a 6-inch (15 cm) by 8-inch (20 cm) by 0.5-inch (1.3 cm) plaque frame
   attaining upper and lower mold temperatures of at least 170° F. (77° C.) and 160° F. (71° C.), respectively
7. Plaque frame with interior dimensions of 6-inch (15 cm) by 8-inch (20 cm) by 0.5-inch (1.3 cm)

Procedure
1. Equilibrate the isocyanate and polyol blend to room temperature (i.e., approximately 25° C.).

2. Heat the upper and lower plaque mold surface temperatures to 170° F. (77° C.) and 160° F. (71° C.), respectively.
3. Ensure that all mold surfaces are sufficiently covered with a thin coating of mold release, like LH-1 from Chem-Trend.
4. Determine the mix quantities for the components (isocyanate and polyol blend). Target an overpack ratio of approximately 3.5. Overpack ratio in this context is defined as the ratio of molded density to free-rise density.
5. Mix the polyol blend well before using. Ensure that polyol blends with multiple phases exhibit a fine, well-dispersed, and uniform emulsion.
6. Weigh the correct amount of polyol blend into a 12 oz. (420 ml) Hot Cup.
7. Weigh the isocyanate into another Hot Cup, add some excess (3 to 4 g.), and remove it from the scale.
8. Tare the cup with the polyol blend.
9. Rapidly pour the isocyanate into the polyol until the correct isocyanate weight is reached.
10. Quickly mix for 10 seconds with the mix blade rotating at 2500 RPM. The mixing procedure should involve fully submersing the blade and orbitally rotating the cup in the opposite direction of the mix blade rotation. Move the cup at roughly one revolution per second. For example, if the mix blade is rotating counterclockwise, move the cup with the reaction mixture in a clockwise direction.
11. Immediately pour the reaction mixture into the plaque frame on the press and close the press to a force of 20,000-lbs (110,000-N). No reinforcement should be used.
12. Start the timer at the point of press closure.
13. Open the press 40-seconds after the point of press closure.
14. After demolding the plaque, observe the polymer dimensional behavior. A fast demold system will maintain the 0.5-inch (1.3 cm) plaque thickness throughout the part and will not exhibit internal cracking. A conventional system will demonstrate ballooning, swelling, or cracking after demolding.

It should be noted that the demold time for the fast demold protocol is 43 to 45-seconds, as measured from the time that the pouring of the reacting liquid component mixture into the mold has been completed.

FIG. 1 illustrates cross-sectional examples of plaques that have been tested using the fast demold protocol. The images shown in FIG. 1 were prepared by cutting the plaques with a bandsaw through the regions that exhibited bulging upon demold.

Example 1

According to the fast demold protocol, 45 screening evaluations were conducted using the base polyol blend shown in Table I. Table II outlines the fast demold results for various surfactants and surfactant concentrations. The concentrations of surfactant 1 and surfactant 2 noted in Table II are weight percentages relative to the total blend weight of surfactant and polyol blend of Table I. The isocyanate used with the system in Table I was RUBINATE® 8700 isocyanate. The weight ratio of the isocyanate to polyol blend was 1.67, and the total reaction mixture blend weight was 175-g. This blend weight results in a molded density of approximately 0.37-g/cm$^3$.

TABLE I

| Component | Weight Percent (%) |
|---|---|
| JEFFOL ® G30-650 polyol | 76.47 |
| Glycerine | 5.74 |
| POLYCAT ® 8 catalyst | 2.68 |
| DABCO ® 8800 catalyst | 0.76 |
| LOXIOL ® G71S polyester | 7.65 |
| UNITOL ® DSR fatty acid | 4.97 |
| KEMESTER ® 5721 tridecyl octadecanoate | 0.84 |
| Water | 0.89 |

TABLE II

| Test # | Surfactant 1 | Surfactant 2 | Concentration of Surfactant 1 in TABLE I Polyol Blend (Weight %) | Concentration of Surfactant 2 in TABLE I Polyol Blend (Weight %) | Fast Demold Protocol Result |
|---|---|---|---|---|---|
| 1 | NIAX ® L6980 surfactant | — | 1.88 | — | Failed - split |
| 2 | TEGOSTAB ® B1400A surfactant | DC ® 200/100 | 0.25 | 0.10 | Passed - no split |
| 3 | TEGOSTAB ® B1400A surfactant | DC ® 200/100 | 0.50 | 0.10 | Passed - no split |
| 4 | TEGOSTAB ® B1400A surfactant | DC ® 200/100 | 1.00 | 0.10 | Passed - no split |
| 5 | TEGOSTAB ® B1400A surfactant | DC ® 200/100 | 0.50 | 0.50 | Passed - no split |
| 6 | TEGOSTAB ® B1400A surfactant | DC ® 200/100 | 1.00 | 0.50 | Passed - no split |
| 7 | TEGOSTAB ® B1400A surfactant | DC ® 200/100 | 1.75 | 2.00 | Passed - no split |
| 8 | TEGOSTAB ® B1400A surfactant | DC ® 200/100 | 2.50 | 2.00 | Passed - no split |
| 9 | TEGOSTAB ® B1400A surfactant | DC ® 200/100 | 2.50 | 5.00 | Passed - no split |
| 10 | TEGOSTAB ® B8418 surfactant | — | 0.50 | — | Failed - split |
| 11 | TEGOSTAB ® B8418 surfactant | — | 0.75 | — | Failed - split |
| 12 | TEGOSTAB ® B8418 surfactant | — | 1.00 | — | Failed - split |

TABLE II-continued

| Test # | Surfactant 1 | Surfactant 2 | Concentration of Surfactant 1 in TABLE I Polyol Blend (Weight %) | Concentration of Surfactant 2 in TABLE I Polyol Blend (Weight %) | Fast Demold Protocol Result |
|---|---|---|---|---|---|
| 13 | TEGOSTAB ® B8444 surfactant | — | 0.50 | — | Failed - split |
| 14 | TEGOSTAB ® B8444 surfactant | — | 1.00 | — | Failed - split |
| 15 | TEGOSTAB ® B8465 surfactant | — | 0.50 | — | Failed - split |
| 16 | TEGOSTAB ® B8465 surfactant | — | 0.75 | — | Failed - split |
| 17 | TEGOSTAB ® B8465 surfactant | — | 1.00 | — | Failed - split |
| 18 | DABCO ® DC5604 surfactant | — | 0.50 | — | Failed - split |
| 19 | DABCO ® DC5604 surfactant | — | 0.75 | — | Failed - split |
| 20 | DABCO ® DC5604 surfactant | — | 1.00 | — | Failed - split |
| 21 | NIAX ® L550 surfactant | — | 0.50 | — | Passed - no split |
| 22 | NIAX ® L550 surfactant | — | 0.75 | — | Passed - no split |
| 23 | NIAX ® L550 surfactant | — | 1.00 | — | Passed - no split |
| 24 | NIAX ® L550 surfactant | — | 1.23 | — | Passed - no split |
| 25 | NIAX ® L550 surfactant | — | 1.48 | — | Passed - no split |
| 26 | NIAX ® L550 surfactant | — | 1.72 | — | Passed - no split |
| 27 | NIAX ® L550 surfactant | — | 2.44 | — | Passed - no split |
| 28 | NIAX ® L550 surfactant | — | 4.76 | — | Passed - no split |
| 29 | NIAX ® L550 surfactant | — | 9.09 | — | Passed - no split |
| 30 | NIAX ® L550 surfactant | NIAX ® L6980 surfactant | 1.00 | 1.00 | Passed - no split |
| 31 | NIAX ® L550 surfactant | NIAX ® L6980 surfactant | 1.00 | 1.50 | Passed - no split |
| 32 | NIAX ® L550 surfactant | NIAX ® L6980 surfactant | 1.00 | 2.00 | Failed - split |
| 33 | NIAX ® L560 surfactant | — | 1.00 | — | Passed - no split |
| 34 | TEGOSTAB ® B8110 surfactant | — | 0.75 | — | Passed - no split |
| 35 | TEGOSTAB ® B8110 surfactant | — | 5.00 | — | Passed - no split |
| 36 | NIAX ® L-540 surfactant | — | 1.00 | — | Passed - no split |
| 37 | TEGOSTAB ® B8240 surfactant | — | 1.00 | — | Passed - no split |
| 38 | TEGOSTAB ® B8228 surfactant | — | 1.00 | — | Passed - no split |
| 39 | TEGOSTAB ® B8870 surfactant | — | 0.50 | — | Passed - no split |
| 40 | TEGOSTAB ® B8870 surfactant | — | 0.75 | — | Passed - no split |
| 41 | TEGOSTAB ® B8870 surfactant | — | 1.00 | — | Passed - no split |
| 42 | TEGOSTAB ® B8454 surfactant | — | 0.50 | — | Failed - split |
| 43 | TEGOSTAB ® B8454 surfactant | — | 0.75 | — | Failed - split |
| 44 | TEGOSTAB ® B8454 surfactant | — | 1.00 | — | Failed - split |
| 45 | NIAX ® L-5340 surfactant | — | 1.00 | — | Failed - split |

Example 2

In accordance with the fast demold protocol, 11 screening tests were conducted using the polyol blend shown in Table III. Table IV outlines the fast demold results for the various fatty esters and fatty ester concentrations. The fatty ester concentrations noted in Table IV are weight percentages relative to the total blend weight of fatty ester and polyol blend of Table III. The isocyanate used with the system in Table III was RUBINATE® 8700 isocyanate. The weight ratio of the isocyanate to polyol blend was 1.61, and the total reaction mixture blend weight was 175-g. This blend weight results in a molded density of approximately 0.37-g/cm$^3$.

TABLE III

| Component | Weight Percent (%) |
|---|---|
| JEFFOL ® G30-650 polyol | 82.06 |
| Glycerine | 6.15 |
| POLYCAT ® 8 catalyst | 2.87 |
| DABCO ® 8800 catalyst | 0.82 |
| UNITOL ® DSR fatty acid | 5.33 |
| KEMESTER ® 5721 tridecyl octadecanoate | 0.91 |
| REACTINT ® X77 colorant | 0.33 |
| NIAX ® L550 surfactant | 0.81 |
| Water | 0.72 |

TABLE IV

| Test Number | Fatty Ester | Concentration of fatty ester in TABLE III Polyol Blend (Weight %) | Fast Demold Protocol Result |
|---|---|---|---|
| 1 | PRIOLUBE ® 1929 fatty ester | 7.50 | Passed - no split |
| 2 | L00.099 fatty ester | 7.50 | Passed - no split |
| 3 | PRIOLUBE ® 1445 fatty ester | 7.50 | Passed - no split |
| 4 | PRIOLUBE ® 2046 fatty ester | 7.50 | Passed - no split |
| 5 | PRIOLUBE ® 3967 fatty ester | 7.50 | Passed - no split |
| 6 | PRIOLUBE ® 3986 fatty ester | 7.50 | Failed - split |
| 7 | LOXIOL ® G71S fatty ester | 0.81 | Failed - split |
| 8 | LOXIOL ® G71S fatty ester | 3.86 | Failed - split |
| 9 | LOXIOL ® G71S fatty ester | 4.61 | Passed - no split |
| 10 | LOXIOL ® G71S fatty ester | 5.36 | Passed - no split |
| 11 | LOXIOL ® G71S fatty ester | 7.50 | Passed - no split |

Example 3

Table V shows fast demold performance for several screening tests. All formulations are tested according to the fast demold protocol with the exception of the 3.5 overpack guideline; all systems were blended such that the total reaction mixture blend weight was 175-g. This blend weight results in a molded density of approximately 0.37-g/cm$^3$. RUBINATE® 8700 isocyanate was the isocyanate used for all polyol blends in Table V. The A/B value refers to the weight ratio of the isocyanate to the polyol blend.

TABLE V

| Polyol Blend | Formulation Number Weight Percent (%) | | | | | | | | |
|---|---|---|---|---|---|---|---|---|---|
| | 1 | 2 | 3 | 4 | 5 | 6 | 7 | 8 | 9 |
| JEFFOL ® G30-650 polyol | 80.41 | 77.34 | 74.95 | 71.75 | 75.40 | 75.25 | 75.09 | — | — |
| Glycerine | 6.03 | 5.80 | 5.62 | 5.38 | 5.65 | 5.64 | 5.63 | 5.44 | 5.97 |
| Polyol A | — | — | — | — | — | — | — | — | 73.77 |
| DALTOLAC ® P130 polyol | — | — | — | — | — | — | — | 67.23 | — |
| dipropylene glycol | — | — | — | — | — | — | — | 7.92 | — |
| JEFFCAT ® PMDETA catalyst | — | — | — | — | — | — | — | — | 1.74 |
| JEFFCAT ® DMCHA catalyst | 2.33 | 2.71 | 2.62 | 2.51 | 2.64 | 2.63 | 2.63 | 1.58 | — |
| DABCO ® 8800 catalyst | 0.76 | 0.77 | 0.75 | 0.72 | 0.75 | 0.75 | 0.75 | 0.40 | — |
| NIAX ® L550 surfactant | 0.80 | 0.77 | 0.74 | 0.71 | 1.00 | 1.00 | 1.00 | 1.00 | 0.50 |
| NIAX ® L6980 surfactant | — | — | — | — | 0.75 | 0.75 | 0.75 | — | — |
| DC ® 200/100 | — | 0.03 | 0.03 | 0.03 | 0.03 | 0.03 | 0.03 | — | — |

TABLE V-continued

| Polyol Blend | Formulation Number Weight Percent (%) | | | | | | | | |
| --- | --- | --- | --- | --- | --- | --- | --- | --- | --- |
| | 1 | 2 | 3 | 4 | 5 | 6 | 7 | 8 | 9 |
| LOXIOL ® G71S polyester | 8.04 | 7.73 | 7.50 | 7.18 | 7.54 | 7.52 | 7.51 | 8.76 | 9.61 |
| UNITOL ® DSR fatty acid | — | 3.00 | 6.00 | 10.00 | 4.90 | 4.89 | 4.88 | 5.69 | 6.25 |
| KEMESTER ® 5721 tridecyl octadecanoate | 0.89 | 0.86 | 0.83 | 0.80 | 0.84 | 0.84 | 0.83 | 0.96 | 1.06 |
| REACTINT ® X77 colorant | — | 0.31 | 0.30 | 0.29 | 0.30 | 0.30 | 0.30 | — | — |
| Water | 0.74 | 0.68 | 0.66 | 0.63 | 0.20 | 0.40 | 0.60 | 1.02 | 1.10 |
| A/B | 1.71 | 1.63 | 1.63 | 1.63 | 1.55 | 1.58 | 1.61 | 1.59 | 1.72 |
| Results of the fast demold protocol | Passed No split | Passed No split | Passed No split | Passed No split | Passed No split | Passed No split | Passed No split | Passed No split | Passed No split |

Example 4

In example 4, the polyol blend is prepared by mixing all components outlined in Table VI in a standard mixing vessel at room temperature. The formulation in Table VI passes the fast demold protocol. The isocyanate and polyol blend are charged to separate tanks in a Krauss-Maffei 'RIM-Star 16' RIM machine equipped with an impingement mix head to prepare the reaction mixture. The isocyanate is RUBINATE® 8700 isocyanate, and the weight ratio of the isocyanate to the polyol blend used in processing is 1.59. The mix head pressure employed to prepare the reaction mixture is 2200 PSI (154.7 kg/cm$^2$).

A 1.0-ounces/ft$^2$ Nicofibers continuous strand fiberglass mat, from Nicofibers Corporation, is placed in an open plaque mold with interior dimensions of 18 inches (45.7 cm) by 30 inches (76.2 cm) by 0.125 inch (0.318 cm). Both component temperatures are 80° F. (27° C.), and the upper and lower mold temperatures are 170° F. (77° C.).

The urethane reaction mixture is poured in a centered strip pour such that the resulting specific gravity of the molded plaque is 0.55. The water absorption of the plaque was 3.31±0.55% per ASTM D570-88.

TABLE VI

| Component | Weight Percent (%) |
| --- | --- |
| JEFFOL ® G30-650 polyol | 75.16 |
| Glycerine | 5.64 |
| POLYCAT ® 8 catalyst | 2.63 |
| DABCO ® 8800 catalyst | 0.75 |
| LOXIOL ® G71S polyester | 7.52 |
| UNITOL ® DSR fatty acid | 4.89 |
| KEMESTER ® 5721 tridecyl octadecanoate | 0.83 |
| REACTINT ® X77 colorant | 0.30 |
| NIAX ® L550 surfactant | 1.00 |
| NIAX ® L6980 surfactant | 0.75 |
| DC ® 200/100 | 0.03 |
| Water | 0.50 |

Example 5

In example 5, the polyol blend is prepared by mixing all components outlined in Table VII in a standard mixing vessel at room temperature. The formulation in Table VII passes the fast demold protocol. The isocyanate and polyol blend are charged to separate tanks in a Krauss-Maffei 'RIM-Star 16' RIM machine equipped with an impingement mix head to prepare the reaction mixture. The isocyanate is RUBINATE® 8700 isocyanate, and the weight ratio of the isocyanate to the polyol blend used in processing is 1.66. The mix head pressure employed to prepare the reaction mixture is 2200 PSI (154.7 kg/cm$^2$).

Production vinyl coverstock from Textileleather Corporation is placed in a production door panel mold and oriented such that the urethane reaction mixture is poured onto the top (i.e., the grained show-side) surface of the vinyl skin. A 0.75-ounces/ft$^2$ continuous strand fiberglass mat is placed on top of the vinyl. Both component temperatures are 80° F. (27° C.), and the upper and lower mold temperatures are 170° F. (77° C.). The glass-reinforced urethane substrate is subsequently prepared and tested for specific gravity, glass content, flexural strength, and flexural modulus.

Three doors of different weights are molded, and samples are removed from the door for physical testing. Table VIII shows the specific gravity, glass content, and flexural data according to ASTM D792-91, ASTM D2584-94, and ASTM D790-92 method II.

TABLE VII

| Component | Weight Percent (%) |
| --- | --- |
| JEFFOL ® G30-650 polyol | 75.64 |
| Glycerine | 5.67 |
| POLYCAT ® 8 catalyst | 2.65 |
| DABCO ® 8800 catalyst | 0.76 |
| LOXIOL ® G71S polyester | 7.56 |
| UNITOL ® DSR fatty acid | 4.92 |
| KEMESTER ® 5721 tridecyl octadecanoate | 0.84 |
| REACTINT ® X77 colorant | 0.30 |
| NIAX ® L550 surfactant | 0.75 |
| DC ® 200/100 | 0.02 |
| Water | 0.89 |

TABLE VIII

| Specific Gravity | Glass Content (%) | Flexural Modulus (MPa) | Flexural Strength (MPa) |
| --- | --- | --- | --- |
| 0.503 ± 0.031 | 14.9 ± 0.6 | 1697 ± 73 | 32.2 ± 2.7 |
| 0.567 ± 0.20 | 14.1 ± 1.9 | 1849 ± 303 | 36.8 ± 6.4 |
| 0.578 ± 0.014 | 13.0 ± 2.3 | 2095 ± 204 | 37.6 ± 1.1 |

Example 6

In example 6, the polyol blends are prepared by mixing the components outlined in Table IX in a standard mixing vessel at room temperature. RUBINATE® 8700 isocyanate is used with all of the formulations shown in Table IX. The isocyanate and polyol blend are charged to a Krauss-Maffei 'RIM-Star 16' RIM machine equipped with an impingement mix head to prepare the reaction mixture. The mix head pressure employed to prepare the reaction mixture is 2200 PSI (154.7 kg/cm$^2$).

In order to evaluate release performance of the various fast demold formulations, the top and bottom metal mold surfaces are prepared by removing solid contaminants with m-pyrol. The m-pyrol then is removed with mineral spirits. A coating of LH-1 paste wax from ChemTrend Corporation then is applied to the metal mold surface. A 1.0-ounce/ft$^2$ continuous strand E-glass fiber mat from CertainTeed Corp. is deposited onto the bottom metal mold surface. The composite products are made by the open pour process wherein the mixed reaction system, made with component temperatures set at 86° F. (30° C.), is poured into a mold heated to 180° F. (82° C.) having the glass fiber mat. The top mold surface is also heated to 180° F. The mold is closed for 60-seconds to cure the foam. Immediately thereafter, the mold is opened and the resulting composite part is removed from the mold. Without cleaning or recoating the mold surfaces, additional composites are made until a composite part fails to completely release from the mold surfaces. The number of releases obtained on consecutive molded parts, i.e., without further application of wax, is recorded. The number of releases obtained for each reaction system are shown in Table IX. All formulations in Table IX pass the fast demold protocol.

The isocyanate and the well-mixed polyol blend are charged to a Konal RIM machine equipped with an impingement mix head to prepare the reaction mixture. The mix head pressure employed to prepare the reaction mixture is 2000 PSI (141 kg/cm$^2$) for both the isocyanate and polyol blend.

The polyol blend and isocyanate component temperatures were both 85° F. (29° C.). The upper and lower mold temperatures were 170° F. (77° C.). Consecutive door panels were produced in a manufacturing setting with normal production tools. The time from end of pour to mold opening was 80-seconds. The upper mold surface was sprayed periodically with an external release agent. Out of 500 door panels, only two panels were scrapped due to a surface-visible void in the glass-reinforced urethane.

TABLE X

| Component | Weight Percent (%) |
|---|---|
| JEFFOL ® G30-650 polyol | 75.04 |
| Glycerine | 5.63 |
| POLYCAT ® 8 catalyst | 2.63 |
| DABCO ® 8800 catalyst | 0.75 |
| LOXIOL ® G71S polyester | 7.50 |
| UNITOL ® DSR fatty acid | 4.88 |
| KEMESTER ® 5721 tridecyl octadecanoate | 0.83 |
| REACTINT ® X77 colorant | 0.30 |
| NIAX ® L550 surfactant | 1.00 |
| NIAX ® L6980 surfactant | 0.75 |
| DC ® 200/100 | 0.03 |
| Water | 0.66 |

TABLE IX

| Polyol Blend | 1 Weight Percent (%) | 2 Weight Percent (%) | 3 Weight Percent (%) | 4 Weight Percent (%) | 5 Weight Percent (%) | 6 Weight Percent (%) |
|---|---|---|---|---|---|---|
| JEFFOL ® G30-650 polyol | 75.80 | 75.91 | 74.92 | 76.08 | 74.33 | 76.15 |
| Glycerine | 5.69 | 5.69 | 5.62 | 5.70 | 5.57 | 5.71 |
| JEFFCAT ® DMCHA catalyst | 2.65 | 2.39 | 2.36 | 2.40 | 2.60 | — |
| DABCO ® 8800 catalyst | 0.76 | 0.68 | 0.67 | 0.68 | 0.74 | — |
| DABCO ® 33LV catalyst | — | — | — | — | — | 2.75 |
| NIAX ® L550 surfactant | 0.75 | 0.75 | 2.25 | 0.75 | 0.98 | 1.01 |
| NIAX ® L3001 | — | — | — | — | 1.75 | — |
| LOXIOL ® G71S polyester | 7.58 | 7.59 | 7.49 | 7.61 | 7.43 | 7.61 |
| UNITOL ® DSR fatty acid | 4.93 | 4.93 | 4.87 | 4.94 | 4.83 | 4.95 |
| KEMESTER ® 5721 tridecyl octadecanoate | 0.84 | 0.84 | 0.83 | 0.84 | 0.82 | 0.85 |
| REACTINT ® X77 colorant | 0.30 | 0.30 | 0.30 | 0.30 | 0.30 | 0.30 |
| DC ® 200/100 | 0.03 | 0.03 | 0.03 | 0.03 | — | — |
| Water | 0.67 | 0.89 | 0.66 | 0.67 | 0.65 | 0.67 |
| A/B | 1.63 | 1.67 | 1.61 | 1.64 | 1.61 | 1.67 |
| Number of releases | >50 | >50 | >50 | >50 | >50 | >50 |

Example 7

In example 7, the polyol blends are prepared by mixing the components outlined in Table X in a standard mixing vessel at room temperature. RUBINATE® 8700 isocyanate is used with the formulation shown in Table X. The weight ratio of the isocyanate to polyol blend in processing is 1.61.

Example 8

In example 8, the polyol blends are prepared by mixing the components outlined in Table XI in a standard mixing vessel at room temperature. RUBINATE® 8700 isocyanate is used with the formulations shown in Table XI, and the weight ratio of the isocyanate to the polyol blend in processing is 1.66. The isocyanate and polyol blend are charged to separate tanks in a Krauss-Maffei 'RIM-Star 16' RIM machine equipped with an impingement mix head to prepare the reaction mixture. The mix head pressure employed to prepare the reaction mixture is 2200 PSI (154.7 kg/cm²).

Production vinyl coverstock from Sandusky Limited is heated to 240° F. (116° C.) in a radiant oven and vacuum formed in a production door panel mold. The show-surface of the vinyl coverstock faces the mold surface. A 0.75-ounces/ft² continuous strand fiberglass mat is placed on top of the vinyl. The temperature of the reaction mixture exiting the mix head (shot temperature) is measured with an IR temperature gun. Door panels are demolded 75-seconds after the end of pour, which corresponds to a mold close-to-open time of 60-seconds. Upon demold, each part is non-destructively inspected for the presence of surface-visible bubbles and voids. Table XII summarizes the various processing conditions and corresponding part quality. All defects noted were minor enough to easily repair in a production setting (i.e., not classified as scrap).

TABLE XI

| Component | Weight Percent (%) |
|---|---|
| JEFFOL ® G30-650 polyol | 75.65 |
| Glycerine | 5.67 |
| POLYCAT ® 8 catalyst | 2.65 |
| DABCO ® 8800 catalyst | 0.76 |
| LOXIOL ® G71S polyester | 7.57 |
| UNITOL ® DSR fatty acid | 4.92 |
| KEMESTER ® 5721 tridecyl octadecanoate | 0.84 |
| REACTINT ® X77 colorant | 0.30 |
| NIAX ® L550 surfactant | 0.75 |
| Water | 0.89 |

TABLE XII

| Run Number | Lower mold temperature (° C.) | Upper mold temperature (° C.) | Shot temperature (° C.) | Number of parts | Total Number of voids | Total Number of bubbles |
|---|---|---|---|---|---|---|
| 1 | 71 | 71 | 34–36 | 24 | 1 | 0 |
| 2 | 82 | 71 | 34–36 | 14 | 0 | 3 |
| 3 | 71 | 82 | 37–40 | 7 | 0 | 0 |
| 4 | 82 | 82 | 34.4–40 | 12 | 1 | 0 |
| 5 | 82 | 82 | 38–39 | 7 | 0 | 0 |

What is claimed:

1. A reaction system suitable for the production of expanded moldings by the RIM process comprising:
   a polyisocyanate composition, including a polyisocyanate having a number averaged isocyanate group functionality of at least 1.8;
   an isocyanate reactive organic composition including at least one organic polyol having a number averaged functionality of primary and/or secondary alcohol groups of at least 1.8;
   at least one blowing agent;
   at least one fatty compound of 10 carbon atoms or greater selected from the group consisting of a fatty polyester, a fatty acid ester, and a fatty amide; and
   a polysiloxane composition including an effective amount of at least one polydimethylsiloxane polyoxyalkylene copolymer containing greater than 60 siloxane linkages;

wherein the polydimethylsiloxane polyoxyalkylene copolymer containing greater than 60 siloxane linkages conforms to the following formula I:

R3Si—[O—SiR'R"]n[O—SiR'"R""]m-O SiR'""3    (I)

wherein R, R', R", and R'"" may be the same or different and at least 80 mole percent of the groups R, R', R", and R'"" are CH₃ groups; all of the groups R, R', R", and R'"" are hydrocarbon groups of 10 carbons or fewer; the number averaged value of n is from 60 to 500; the number averaged value of m is from 2 to 10; the groups R'" and R"" may be the same or different and are selected from the group consisting of aliphatic hydrocarbons of 4 carbons or fewer and polyoxyalkylene blocks according to formula II; and at least one of the groups selected from R'" and R"" is a polyoxyalkylene block according to formula II:

-L-O—[PO]x[EO]y[AO]z-O-T    (II)

wherein PO denotes an oxypropylene unit, EO denotes an oxyethylene unit, and AO denotes an optional oxyalkylene unit of greater than three carbon atoms; the ratio of z to the quantity x+y+z is less than 1/5; the number averaged value of x is from 15 to 30; the number averaged value of y is from 8 to 40; the ratio of x/y is from 1 to 5; the group L is an optional divalent linking group which, when present, is a divalent hydrocarbon group having fewer than 20 carbon atoms; and the group T is selected from the group consisting of H and hydrocarbon groups of less than 20 carbon atoms; and wherein the at least one fatty compound comprises an inert aliphatic compound that is free of aromatic rings.

2. A reaction system suitable for the production of expanded moldings by the RIM process comprising:
   a polyisocyanate composition including a polyisocyanate having a number averaged isocyanate group functionality of at least 1.8;
   an isocyanate reactive organic composition including at least one organic polyol having a number averaged functionality of primary and/or secondary alcohol groups of at least 1.8;
   at least one blowing agent;
   at least one fatty polyester compound of 20 carbon atoms or greater, the fatty polyester containing at least 4 ester groups per molecule; and
   a polysiloxane composition including an effective amount of at least one polydimethylsiloxane polyoxyalkylene copolymer containing from greater than 70 to less than 150 siloxane linkages;

wherein the polydimethylsiloxane polyoxyalkylene copolymer containing greater than 70 to less than 150 siloxane linkages conforms to the following formula I:

R3Si—[O—SiR'R"]n[O—SiR'"R""]m-O SiR'""3    (I)

wherein R, R', R", and R'"" may be the same or different and at least 90 mole percent of the groups R, R', R", and R'"" are CH3 groups; all of the groups R, R', R", and R'"" are hydrocarbon groups of 4 carbons or fewer; the number averaged value of n is at least 60; the number averaged value of m is from 2 to 8; the groups R'" and R"" may be the same or different and are selected from the group consisting of aliphatic hydrocarbons of 4 carbons or fewer and polyoxyalkylene blocks according to formnula II; and at least one of the groups selected from R'" and R"" is a polyoxyalkylene block according to formula II:

-L-O—[PO]x[EO]y-O-T    (II)

wherein PO denotes an oxypropylene unit and EO denotes an oxyethylene unit; the number averaged value of x is from 15 to 30; the number averaged value of y is from 8 to 40; the ratio of x/y is from 1.1 to 3; the group L is an optional divalent linking group which, when present, is a divalent aliphatic hydrocarbon group having fewer than 10 carbon atoms; and the group T is selected from the group consisting of hydrocarbon groups of less than 10 carbon atoms.

3. A reaction system suitable for the production of expanded moldings by the RIM process comprising:

a polyisocyanate composition, including a polyisocyanate having a number averaged isocyanate group functionality of at least 1.8;

an isocyanate reactive organic composition including at least one organic polyol having a number averaged functionality of primary and/or secondary alcohol groups of at least 1.8;

at least one blowing agent;

at least one fatty polyester compound of 20 carbon atoms or greater, the fatty polyester containing at least 4 ester groups per molecule; and an effective amount of at least one polydimethylsiloxane polyoxyalkylene copolymer containing from greater than 70 siloxane linkages, to 100 siloxane linkages;

wherein the at least one fatty polyester compound is free of aromatic rings;

wherein the polydimethylsiloxane polyoxyalkylene copolymer is further characterized by containing from 35 to 70% of its molecular weight in the form of dimethylsiloxane units, by having a molecular weight in the range of 10000 to 18000, by containing a plurality of aliphatic ether linkages, and by containing less than 10 mole percent of oxyalkylene units other than oxyethylene or oxypropylene units; and wherein the polydimethylsiloxane polyoxyalkylene copolymer containing from greater than 70 to 100 siloxane linkages conforms to the following formula I:

R3Si—[O—SiR'R"]n[O—SiR'"R""]m-O SiR'""3    (I)

wherein R, R', R", and R'"" may be the same or different and at least 90 mole percent of the groups R, R', R", and R'"" are CH3 groups; all of the groups R, R', R", and R'"" are hydrocarbon groups of 4 carbons or fewer; the number averaged value of n is at least 65; the number averaged value of m is from 3 to 6; the groups R'" and R"" are individually selected from the group consisting of $CH_3$ groups and polyoxyalkylene blocks according to formula II; and one of the groups selected from R'" and R"" is a polyoxyalkylene block according to the following formula II:

-L-O—[PO]x[EO]y[AO]z-O-T    (II)

wherein PO denotes an oxypropylene unit, EO denotes an oxyethylene unit, and AO denotes an optional oxyalkylene unit of greater than 3 but fewer than 6 carbons; the number averaged value of x is from 18 to 25; the number averaged value of y is from 12 to 20; the ratio of x/y is from 1.2 to 2; the group L is a divalent linking group which is a divalent aliphatic hydrocarbon group having fewer than 10 carbon atoms; and the group T is selected from the group consisting of hydrocarbon groups of fewer than 5 carbon atoms.

4. The reaction system according to claim 3, wherein the polydimethylsiloxane polyoxyalkylene copolymer contains from 75 to 95 siloxane linkages, and is further characterized by containing both a plurality of oxyethylene units and a plurality of oxypropylene units, wherein the mole ratio of oxypropylene units to oxyethylene units is in the range of 1.2 to 2.

5. The reaction system according to claim 3, wherein the polydimethylsiloxane polyoxyalkylene copolymer is characterized by having 3 to 4 polyoxyalkylene side chains linked to a linear polydimethylsiloxane main chain by means of hydrolytically stable Si—C linkages, wherein the individual side chains each consist essentially of a random copolymer of ethylene oxide with propylene oxide, an organic divalent linking group of 2 to 5 carbon atoms, and an organic monovalent terminal group selected from the group consisting of alkyl groups of 1 to 2 carbon atoms, hydrogen, or combinations of these terminal groups.

6. The reaction system according to claim 4, wherein the polydimethylsiloxane polyoxyalkylene copolymer is characterized by having 3 to 4 polyoxyalkylene side chains linked to a linear polydimethylsiloxane main chain by means of hydrolytically stable Si—C linkages, wherein the individual side chains each consist essentially of a random copolymer of ethylene oxide with propylene oxide, an organic divalent linking group of 2 to 5 carbon atoms, and an organic monovalent terminal group selected from the group consisting of alkyl groups of 1 to 2 carbon atoms, hydrogen, or combinations of these terminal groups.

7. The reaction system according to claim 6, wherein the terminal groups of the polyoxyalkylene side chains on the polydimethylsiloxane polyoxyalkyene copolymer are predominantly methyl groups bound to the terminal oxygen of each polyether chain, and the divalent linking groups linking the chains to the polydimethylsiloxane main chain are trimethylene groups.

8. The reaction system according to claim 4, wherein the polydimethylsiloxane main chain of the polydimethylsiloxane polyoxyalkylene copolymer is free of siloxane branches, essentially all of the terminal groups of the polyoxyalkylene side chains are methyl groups, and the polydimethylsiloxane polyoxyalkylene copolymer is essentially free of oxyalkylene groups other than oxyethylene and oxypropylene.

9. A mat reinforced LD-S-RIM molded foam article produced from the reaction system of claim 1.

10. A mat reinforced LD-S-RIM molded foam article produced from the reaction system of claim 2.

11. A mat reinforced LD-S-RIM molded foam article produced from the reaction system of claim 3.

12. A mat reinforced LD-S-RIM molded foam article produced from the reaction system of claim 4.

13. A mat reinforced LD-S-RIM molded foam article produced from the reaction system of claim 5.

14. A mat reinforced LD-S-RIM molded foam article produced from the reaction system of claim 6.

15. A mat reinforced LD-S-RIM molded foam article produced from the reaction system of claim 7.

16. A mat reinforced LD-S-RIM molded foam article produced from the reaction system of claim 8.

17. The reaction system according to claim 1, wherein the blowing agent comprises water as the principle blowing agent.

18. The reaction system according to claim 2, wherein the blowing agent comprises water as the principle blowing agent.

19. The reaction system according to claim 3, wherein the blowing agent comprises water as the principle blowing agent.

20. The reaction system according to claim 4, wherein the blowing agent comprises water as the principle blowing agent.

21. The reaction system according to claim 5, wherein the blowing agent comprises water as the principle blowing agent.

22. The reaction system according to claim 6, wherein the blowing agent comprises water as the principle blowing agent.

23. The reaction system according to claim 7, wherein the blowing agent comprises water as the principle blowing agent.

24. The reaction system according to claim 8, wherein the blowing agent comprises water as the principle blowing agent.

25. A mat reinforced LD-S-RIM molded foam article produced from the reaction system of claim 8, wherein the blowing agent consists essentially of one or more members selected from the group consisting of water, air, nitrogen, carbon dioxide, or argon; under the proviso that water is the principle blowing agent responsible for most of the volume expansion.

* * * * *